US012027121B2

(12) United States Patent
Seo et al.

(10) Patent No.: US 12,027,121 B2
(45) Date of Patent: Jul. 2, 2024

(54) DISPLAY PANEL AND DISPLAY DEVICE INCLUDING THE SAME

(71) Applicant: Samsung Display Co., Ltd., Yongin-Si (KR)

(72) Inventors: Hae-Kwan Seo, Hwaseong-si (KR); Jinyoung Roh, Hwaseong-si (KR); Youngha Sohn, Seongnam-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/105,896

(22) Filed: Feb. 6, 2023

(65) Prior Publication Data

US 2023/0326405 A1 Oct. 12, 2023

(30) Foreign Application Priority Data

Apr. 12, 2022 (KR) ........................ 10-2022-0045393

(51) Int. Cl.
*G09G 3/3233* (2016.01)

(52) U.S. Cl.
CPC ... *G09G 3/3233* (2013.01); *G09G 2300/0413* (2013.01); *G09G 2300/0426* (2013.01); *G09G 2300/0452* (2013.01); *G09G 2300/0819* (2013.01); *G09G 2300/0842* (2013.01); *G09G 2310/0202* (2013.01);
(Continued)

(58) Field of Classification Search
CPC .. H10K 59/353; H10K 59/131; H10K 59/352; G09G 3/3266; G09G 3/3275; G09G 2300/0452; G09G 3/2003; G09G 2300/0819; G09G 2300/0861; G09G 2310/0267; G09G 2310/0286; G09G 2320/0223; G09G 2320/0233; G09G 2320/0238; G09G 3/3208; G09G 2300/0439; G09G 2300/0469; G09G 2320/0257; G09G 3/3233; G09G 2300/0413; G09G 2300/0426; G09G 2300/0842; G09G 2310/0202; G09G 2310/0272; G09G 2330/021; G09G 2340/06
See application file for complete search history.

(56) References Cited

U.S. PATENT DOCUMENTS

2015/0103103 A1* 4/2015 Kim .................... G09G 3/3233 345/690
2017/0270868 A1 9/2017 Li et al.
(Continued)

FOREIGN PATENT DOCUMENTS

CN 208607570 U 3/2019
KR 10-2021-0055850 A 5/2021
(Continued)

*Primary Examiner* — Md Saiful A Siddiqui
(74) *Attorney, Agent, or Firm* — Innovation Counsel LLP

(57) ABSTRACT

A display panel includes a plurality of first pixel parts disposed in a first row, a plurality of second pixel parts disposed in a second row and including a first pixel part that includes a first pixel circuit and a first light emitting element which are electrically separated from each other, and a second pixel part that includes a second pixel circuit and a second light emitting element which are electrically separated from each other. The first light emitting element of the first pixel part is electrically connected to the second pixel circuit of the second pixel part.

24 Claims, 18 Drawing Sheets

(52) U.S. Cl.
CPC ............... *G09G 2310/0272* (2013.01); *G09G 2330/021* (2013.01); *G09G 2340/06* (2013.01)

(56) References Cited

U.S. PATENT DOCUMENTS

| | | | | |
|---|---|---|---|---|
| 2019/0279563 | A1* | 9/2019 | Hwang ................ | G09G 3/3225 |
| 2020/0168159 | A1* | 5/2020 | Kim ..................... | G09G 3/3225 |
| 2021/0134892 | A1 | 5/2021 | Hwang et al. | |
| 2021/0143237 | A1 | 5/2021 | Lee et al. | |
| 2021/0319754 | A1 | 10/2021 | Shang et al. | |
| 2022/0148503 | A1 | 5/2022 | Seo et al. | |
| 2022/0406854 | A1* | 12/2022 | Choi .................... | G09G 3/3266 |

FOREIGN PATENT DOCUMENTS

| | | | |
|---|---|---|---|
| KR | 10-2022-0064463 | A | 5/2022 |
| WO | WO 2021/158240 | A1 * | 8/2021 |

* cited by examiner

DISPLAY PANEL AND DISPLAY DEVICE INCLUDING THE SAME

CROSS-REFERENCE TO RELATED APPLICATIONS

This U.S. non-provisional patent application claims priority under 35 U.S.C. § 119 of Korean Patent Application No. 10-2022-0045393, filed on Apr. 12, 2022, the entire contents of which are hereby incorporated by reference.

BACKGROUND

The present disclosure herein relates to a display device.

In general, a display device includes a display panel for displaying an image and a driving circuit for driving the display panel. The display panel includes a plurality of scan lines, a plurality of data lines, and a plurality of pixels. The driving circuit includes a data driving circuit that outputs a data driving signal to the data lines, a scan driving circuit that outputs a scan signal for driving the scan lines, and a driving controller that controls the data driving circuit and the scan driving circuit.

Such the display device may display an image to be displayed by outputting the scan signals to the scan lines connected to pixels and providing data voltages corresponding to the display image to the data lines connected to the pixels.

In addition, each of the plurality of pixels may provide any one of light having various colors, such as red light, green light, and blue light. Each of the plurality of pixels may include a light emitting element and a pixel circuit for driving the light emitting element. A size and arrangement of each of the plurality of pixels may vary.

SUMMARY

Embodiments of the present disclosure provide a display panel having reduced power consumption and a display device.

According to an embodiment, a display panel includes: a plurality of first row pixel parts disposed in a first row; and a plurality of second row pixel parts disposed in a second row, the plurality of second row pixel parts comprising: a first pixel part including a first pixel circuit and a first light emitting element which are electrically separated from each other; and a second pixel part including a second pixel circuit and a second light emitting element which are electrically separated from each other. The first light emitting element of the first pixel part is electrically connected to the second pixel circuit of the second pixel part.

In an embodiment, each of the plurality of first row pixel parts may include a pixel circuit and a light emitting element that is electrically connected to the pixel circuit.

In an embodiment, the display panel may further include: a first data line electrically connected to the first pixel circuit; and a second data line electrically connected to the second pixel circuit. The first data line may receive a first color signal, and the second data line may receive a second color signal different from the first color signal.

In an embodiment, the display panel may further include a third pixel part disposed in the second row and including a third pixel circuit and a third light emitting element, which are electrically connected to one another.

In an embodiment, the first light emitting element, the second light emitting element, and the third light emitting element may emit light having colors different from each other.

According to an embodiment, a display device includes: a display panel including a first data line, a second data line, first pixel parts disposed in a first row, and second pixel parts disposed in a second row; a driving circuit which receives an input image signal and output an output image signal corresponding to the input image signal; and a data driving circuit which provides a data signal to each of the first data line and the second data line in response to the output image signal. A second pixel part connected to the first data line among the second pixel parts may include a first pixel circuit and a first light emitting element which are electrically separated from each other, a second pixel part connected to the second data line among the second pixel parts includes a second pixel circuit and a second light emitting element which are electrically separated from each other, and the first light emitting element is electrically connected to the second pixel circuit.

In an embodiment, the first data line and the second data line may be disposed to be space apart from each other with at least one data line disposed therebetween.

In an embodiment, the data driving circuit may provide a first color signal to the second data line and provide a second color signal different from the first color signal to the first data line.

In an embodiment, the display device may further include a third data line, wherein the display panel may further include dummy pixel parts which is connected to the third data line, each of the dummy pixel parts may include a dummy pixel circuit, and the second light emitting element may be electrically connected to the dummy pixel circuit of a corresponding dummy pixel part among the dummy pixel parts.

In an embodiment, the data driving circuit may provide a first color signal to the second data line and provide a second color signal different from the first color signal to the first data line and the third data line.

In an embodiment, the driving circuit may include: an image processor which outputs a data signal corresponding to the input image signal; and a data output circuit which outputs the output image signal in which an output order of the data signal is changed so that the second color signal is output to the first data line and the third data line, and the first color signal is output to the second data line in response to a control signal.

In an embodiment, a first pixel part connected to the first data line among the first pixel parts may include a pixel circuit and a light emitting element which are electrically connected to each other, and a first pixel part connected to the second data line among the first pixel parts may include a pixel circuit and a light emitting element which are electrically connected to each other.

In an embodiment, the first pixel part connected to the first data line among the first pixel parts and the first pixel part connected to the second data line among the first pixel parts may be disposed in a first row, and the second pixel part connected to the first data line among the second pixel parts and the second pixel part connected to the second data line among the second pixel parts may be disposed in a second row.

According to an embodiment, a display panel includes: a first pixel part in which a first light emitting element including an anode and a cathode and a first pixel circuit are disposed; a second pixel part in which a second light emitting element including an anode and a cathode and a second pixel circuit are disposed; and a connection line extending from the anode of the first light emitting element and electrically connected to the second pixel circuit.

In an embodiment, the second pixel circuit may include at least one transistor electrically connected to the connection line.

In an embodiment, the display panel may further include: a dummy pixel part including a dummy pixel circuit; and a dummy connection line extending from the anode of the second light emitting element and electrically connected to the dummy pixel circuit.

According to an embodiment, a display device includes: a first row first pixel part arranged in a first row and including a first pixel circuit and a first light emitting element which are electrically connected to each other; a first row second pixel part arranged in the first row and including a second pixel circuit and a second light emitting element which are electrically connected to each other; a second row first pixel part arranged in a second row and including a third pixel circuit and a third light emitting element which are electrically separated from each other; a second row second pixel part arranged in the second row and including a fourth pixel circuit and a fourth light emitting element, which are electrically separated from each other; an auxiliary connection line which electrically connects the first pixel circuit and the first light emitting element of the first row first pixel part to each other; and a connection line which electrically connects the third light emitting element of the second row first pixel part to the fourth pixel circuit of the second row second pixel part.

In an embodiment, the display device may further include: a first data line electrically connected to the first pixel circuit and the third pixel circuit; a second data line electrically connected to the second pixel circuit and the fourth pixel circuit; and a data driving circuit which provides a first color signal to the second data line and provide a second color signal different from the first color signal to the first data line.

In an embodiment, the display device may further include a driving circuit which receives an input image signal and output an output image signal corresponding to the input image signal, wherein the data driving circuit may provide the first color signal to the second data line and provide the second color signal to the first data line in response to the output image signal.

In an embodiment, the driving circuit may include: an image processor which outputs a data signal corresponding to the input image signal; and a data output circuit which outputs the output image signal in which an output order of the data signal is changed so that the second color signal is output to the first data line, and the first color signal is output to the second data line.

In an embodiment, each of the second light emitting element and the third light emitting element may output light having a first color, and each of the first light emitting element and the fourth light emitting element may output light having a second color.

In an embodiment, the first light emitting element may include an anode and a cathode, and the auxiliary connection line may extend from the anode and electrically connected to the first pixel circuit.

In an embodiment, the third light emitting element may include an anode and a cathode, and the connection line may extend from the anode and electrically connected to the fourth pixel circuit.

According an embodiment, a display device includes: a first data line which transmits a first data signal corresponding to a first color; a second data line which transmits a second data signal corresponding to a second color; a first pixel part in which a first pixel circuit connected to the first data line and a first light emitting element that is electrically separated from the first pixel circuit are disposed; a second pixel part in which a second pixel circuit connected to the second data line and a second light emitting element that is electrically separated from the second pixel circuit are disposed; and a connection line which electrically connects the first light emitting element of the first pixel part to the second pixel circuit of the second pixel part.

In an embodiment, the first light emitting element may emit light corresponding to the second color, and the second light emitting element may emit light corresponding to the first color.

In an embodiment, the display device may further include: a dummy data line which transmits a third data signal corresponding to the second color; a dummy pixel part comprising a dummy pixel circuit connected to the dummy data line; and a dummy connection line which electrically connects the second light emitting element to the dummy pixel circuit.

In an embodiment, the display device may further include: a third pixel part in which a third pixel circuit connected to the first data line and a third light emitting element electrically connected to the third pixel circuit are disposed; and a fourth pixel part in which a fourth pixel circuit connected to the second data line and a fourth light emitting element electrically connected to the fourth pixel circuit are disposed.

In an embodiment, the third light emitting element may emit light corresponding to the first color, and the fourth light emitting element may emit light corresponding to the second color.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
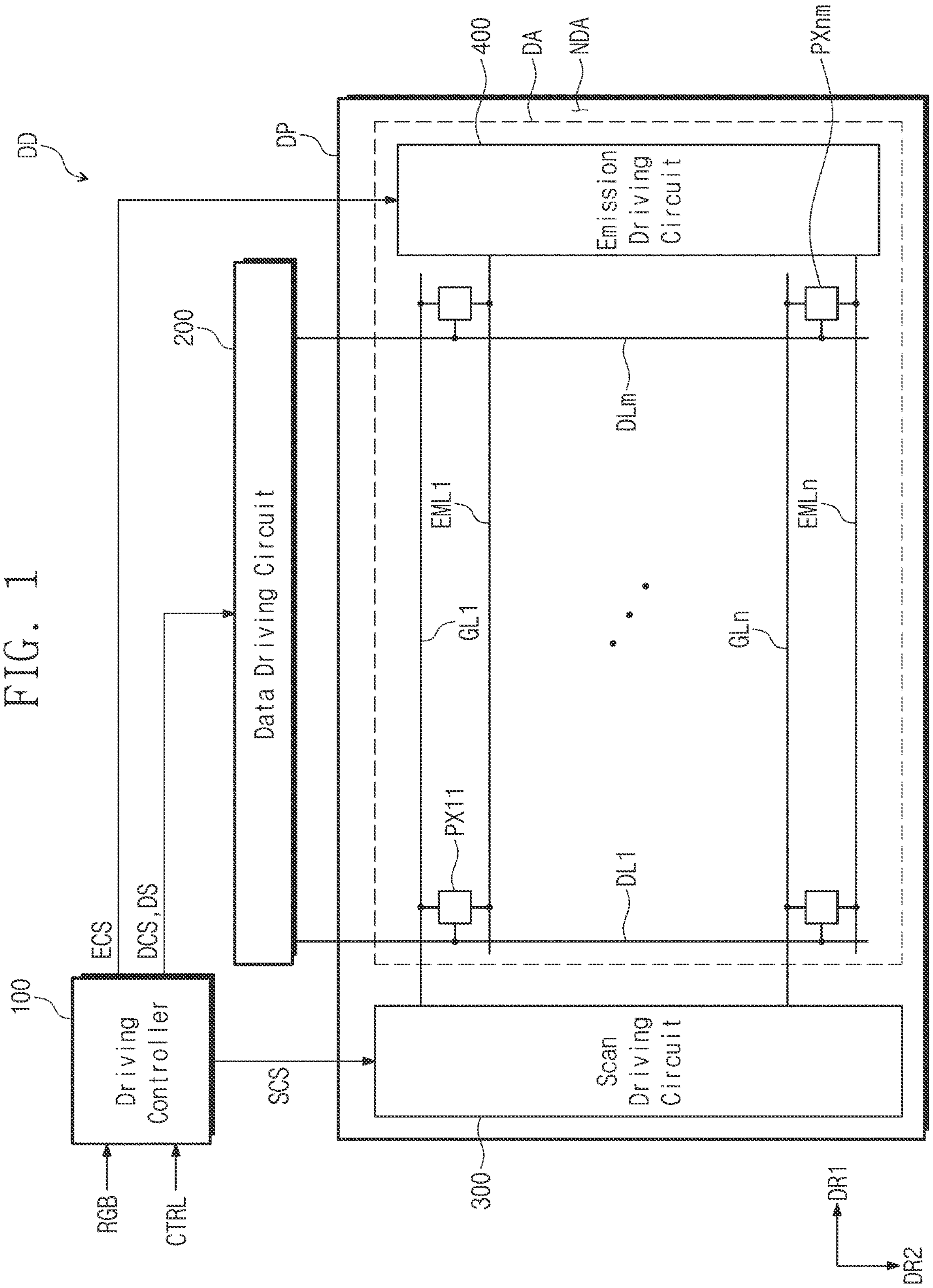
FIG. 1 is a block diagram of a display device according to an embodiment of the present disclosure.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration. The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in an embodiment can be referred to as a second element in another embodiment without departing from the scope of the appended claims. The terms of a singular form may include plural forms unless referred to the contrary.

Also, "under", "below", "above', "upper", and the like are used for explaining relation association of components illustrated in the drawings. The terms may be a relative concept and described based on directions expressed in the drawings.

The meaning of "include" or "comprise" specifies a property, a fixed number, a step, an operation, an element, a component or a combination thereof, but does not exclude other properties, fixed numbers, steps, operations, elements, components or combinations thereof.

Unless otherwise defined, all terms (including technical and scientific terms) used herein have the same meaning as commonly understood by a person of ordinary skill in the art to which the present inventive concept belongs. In addition, terms such as terms defined in commonly used dictionaries should be interpreted as having a meaning consistent with the meaning in the context of the related technology, and unless explicitly defined here, they are interpreted as too ideal or too formal sense.

Hereinafter, embodiments of the present inventive concept will be described with reference to the accompanying drawings.

FIG. 1 is a block diagram of a display device according to an embodiment of the present disclosure.

Referring to FIG. 1, a display device DD includes a driving controller 100, a data driving circuit 200, and a display panel DP.

The driving controller 100 receives an input image signal RGB and a control signal CTRL. The driving controller 100 generates an output image signal DS by converting the input image signal RGB into an image type that is suitable for the display panel DP. The driving controller 100 outputs a scan control signal SCS and a data control signal DCS.

According to an embodiment of the present disclosure, the display panel DP may be an emission-type display panel. For example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, and the like. Hereinafter, in this embodiment, the display panel DP is described as an organic light emitting display panel.

The display panel DP includes scan lines GL1 to GLn, data lines DL1 to DLm, and pixels PX11 to PXnm, where each of n and m is a natural number greater than 0.

The display panel DP includes a display area DA and a non-display area NDA. In an embodiment, a display area DA has a rectangular shape, but an embodiment of the present disclosure is not limited thereto. A non-display area NDA may have a frame shape surrounding the display area DA.

The display panel DP may further include a scan driving circuit 300 and an emission driving circuit 400. The pixels PX11 to PXnm may be disposed in the display area DA, and the scan driving circuit 300 and the emission driving circuit 400 may be disposed in the non-display area NDA.

The scan lines GL1 to GLn extend from the scan driving circuit 300 in a first direction DR1 and are arranged to be spaced apart from each other in a second direction DR2. The emission control lines EML1 to EMLn extend from the emission driving circuit 400 in a direction opposite to the first direction DR1 and are arranged to be spaced apart from each other in the second direction DR2. The data lines DL1 to DLm extend from the data driving circuit 200 in the second direction DR2 and are arranged to be spaced apart from each other in the first direction DR1.

Each of the pixels PX11 to PXnm may be connected to a corresponding scan line of the scan lines GL1 to GLn, may be connected to a corresponding data line of the data lines DL1 to DLm, and may be connected to a corresponding emission control line of the emission control lines EML1 to EMLn. Although each of the plurality of pixels PX11 to PXnm is illustrated in FIG. 1 as being connected to one scan line, an embodiment of the present disclosure is not limited thereto. Each of the plurality of pixels PX11 to PXnm may be electrically connected to two or more scan lines.

Each of the pixels PX11 to PXnm may include a light emitting element and a pixel circuit controlling emission of the light emitting element. The light emitting element and the pixel circuit will be described in detail later.

The data driving circuit 200 receives the data control signal DCS and the output image signal DS from the driving controller 100. The data driving circuit 200 converts the output image signal DS into data signals and outputs the data signals to the data lines DL1 to DLm. Each of the data signals may have a voltage level corresponding to a gradation level of the output image signal DS.

The data driving circuit 200 may be implemented as an integrated circuit (IC) and be directly mounted in a predetermined area of the display panel DP or mounted on a separate printed circuit board in a chip on film (COF) manner so as to be electrically connected to the display panel DP. In an embodiment, the data driving circuit 200 may be formed on the display panel DP through the same process as the pixel circuit of each of the pixels PX11 to PXnm.

The scan driving circuit 300 receives the scan control signal SCS from the driving controller 100. The scan driving circuit 300 may output scan signals to the scan lines GL1 to GLn in response to the scan control signal SCS. In an embodiment, the scan driving circuit 300 may be formed through the same process as the pixel circuit of each of the pixels PX11 to PXnm.

The emission driving circuit 400 receives an emission driving signal ECS from the driving controller 100. The emission driving circuit 400 may output emission control signals to the emission control lines EML1 to EMLn in response to the emission driving signal ECS. In an embodiment, the emission driving circuit 400 may be formed through the same process as the pixel circuit of each of the pixels PX11 to PXnm.

The driving controller 100, the data driving circuit 200, the scan driving circuit 300, and the emission driving circuit 400 may be driving circuits which provide a data signal corresponding to the input image signal RGB to the pixels PX11 to PXnm.

Figure 2:
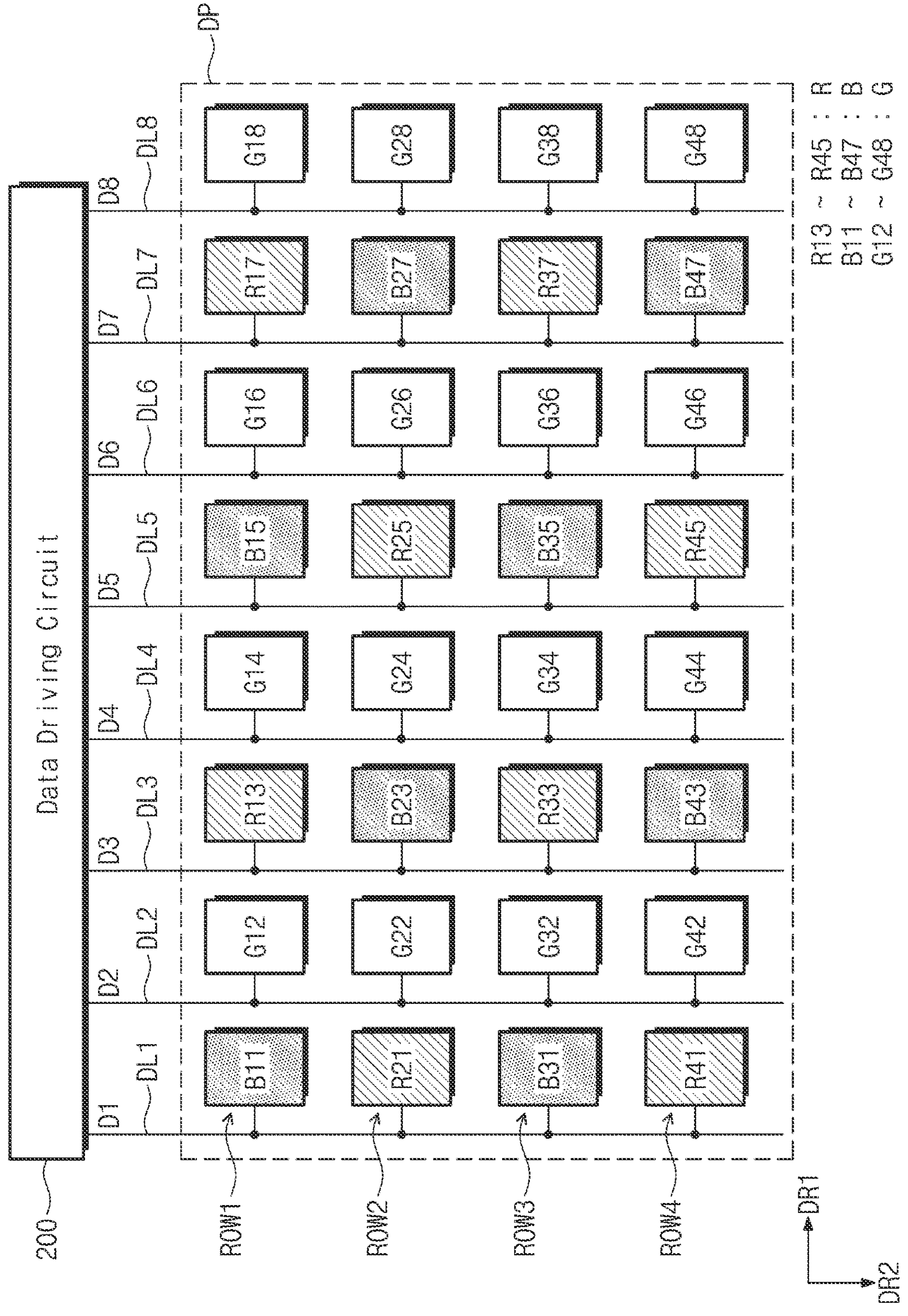
FIG. 2 is a view illustrating an example of an arrangement of first to third pixel parts.

FIG. 2 is a view illustrating an example of an arrangement of first to third pixel parts.

Referring to FIG. 2, the display panel DP includes pixels and data lines DL1 to DL8. The display panel DP may include a plurality of pixel parts, and each of the pixels PX11 to PXnm illustrated in FIG. 1 may be disposed in a corresponding pixel part among the plurality of pixel parts.

The pixel parts include first pixel parts R13, R17, R21, R25, R33, R37, R41, and R45, second pixel parts B11, B15, B23, B27, B31, B35, B43, and B47, and third pixel parts G12, G14, G16, G18, G22, G24, G26, G28, G32, G34, G36, G38, G42, G44, G46, and G48. In the following description, the first pixel parts R13, R17, R21, R25, R33, R37, R41, and R45 are also referred to as first pixel parts R, the second pixel parts B11, B15, B23, B27, B31, B35, B43, and B47 are also referred to as second pixel parts B, and the third pixel parts G12, G14, G16, G18, G22, G24, G26, G28, G32, G34, G36, G38, G42, G44, G46, and G48 are also referred to as third pixel parts G.

In FIG. 2, the first pixel parts R, the second pixel parts B, and the third pixel parts G connected to the eight data lines DL1 to DL8 are illustrated, but an embodiment of the present disclosure is not limited thereto. The number of data lines disposed on the display panel DP and the number of pixel parts disposed on the display panel DP may be variously changed.

In an embodiment, the first pixel parts R may be pixel parts including a light emitting element emitting light having a red color, and the second pixel parts B may be pixel parts including a light emitting element emitting light having a blue color, and the third pixel parts G may be pixel parts including a light emitting element emitting light having a green color. However, an embodiment of the present disclosure is not limited thereto, and the first pixel parts R, the second pixel parts B, and the third pixel parts G may include pixel parts including the light emitting elements that emits light having various colors such as yellow, cyan, magenta, and white.

Each pixel of the first pixel parts R, the second pixel parts B, and the third pixel parts G may be connected to a corresponding data line among the data lines DL1 to DL8.

The first pixel parts R, the second pixel parts B, and the third pixel parts G may be arranged in first to fourth rows ROW1, ROW2, ROW3, and ROW4. Although not shown in the drawings, the pixels of the pixel parts arranged in the same row among the first pixel parts R, the second pixel parts B, and the third pixel parts G in the first direction DR1 may be connected to the same scan line. For example, the pixels of the pixel parts B11, G12, R13, G14, B15, G16, R17, and G18 in the first row ROW1 may be commonly connected to the same scan line, and the pixels of the pixel parts R21, G22, B23, G24, R25, G26, B27, and G28 in the second row ROW2 may be commonly connected to the same scan line.

The pixels of the second pixel parts B and the pixels of the first pixel parts R are alternatively connected the same data line, for example, each of data lines DL1 and DL5, in the second direction DR2. The pixels of the first pixel parts R and the pixels of the second pixel parts B are alternatively connected to the same data line, for example, each of data lines DL3 and DL7, in the second direction DR2. The pixels of the third pixel parts G may be connected to the data lines DL2, DL4, DL6, and DL8.

Figure 3A:
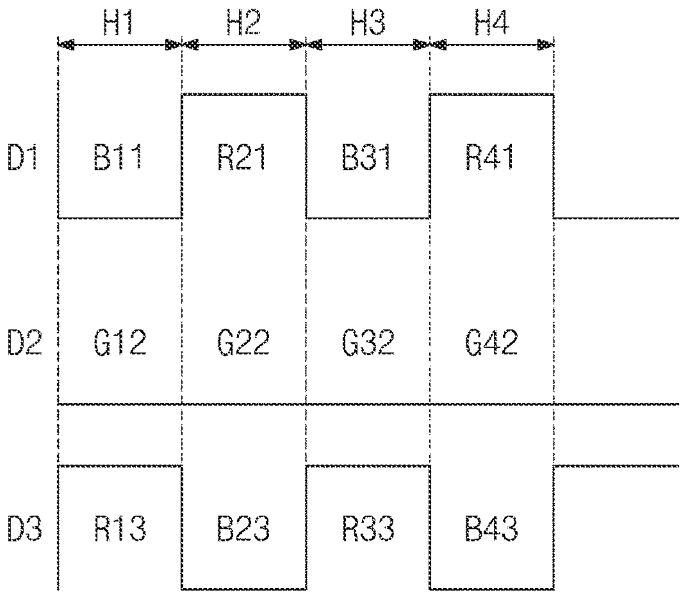
FIGS. 3A and 3B are views illustrating an example of gradation levels of data signals output from a data driving circuit illustrated in FIG. 2.
Figure 3B:
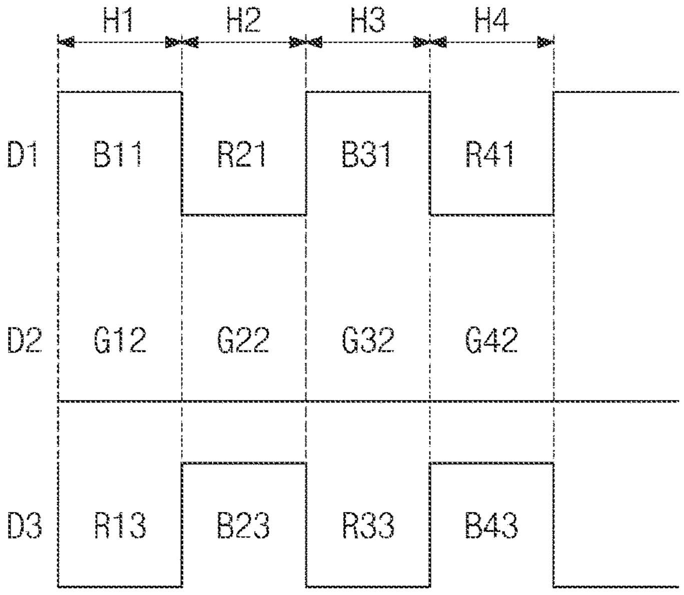

FIGS. 3A and 3B are views illustrating an example of gradation levels of the data signals D1, D2, and D3 output from the data driving circuit 200 illustrated in FIG. 2.

FIG. 3A illustrates an example of the data signals D1, D2, and D3 output to data lines DL1, DL2, and DL3 through the data driving circuit 200 when a red pattern image is displayed on the display panel DP.

Referring to FIGS. 2 and 3A, the data signal D1 provided from the data driving circuit 200 to the data line DL1 is provided to the second pixel part B11 during a first horizontal period H1, provided to the first pixel part R21 during a second horizontal period H2, provided to the second pixel part B31 during a third horizontal period H3, and provided to the first pixel part R41 during a fourth horizontal period H4.

The data signal D2 provided from the data driving circuit 200 to the data line DL2 is provided to the third pixel part G12 during the first horizontal period H1, provided to the third pixel part G22 during the second horizontal period H2, provided to the third pixel part G32 during the third horizontal period H3, and provided to the third pixel part G42 during the fourth horizontal period H4.

The data signal D3 provided from the data driving circuit 200 to the data line DL3 is provided to the first pixel part R13 during the first horizontal period H1, provided to the second pixel part B23 during the second horizontal period H2, provided to the first pixel part R33 during the third horizontal period H3, and provided to the second pixel part B43 during the fourth horizontal period H4.

When the red pattern image is displayed on the display panel DP, data signals to be provided to the first pixel parts R21, R41, R13, and R33 may correspond to the highest gradation level, and data signals to be provided to the second pixel parts B11, B31, B23, and B43 and the third pixel parts G12, G22, G32, and G42 may correspond to the lowest gradation level.

As illustrated in FIG. 3A, when the red pattern image is displayed on the display panel DP, the data signals D1 and D3 provided from the data driving circuit 200 to the data lines DL1 and DL3 have the highest gradation level and the lowest gradation level, which are changed for every one horizontal period. As a signal level change width of each of the data signals D1 and D3 is large and the number of times of signal level changes increases, power consumption of the display device 100 may increase.

FIG. 3B illustrates an example of the data signals D1, D2, and D3 output to data lines DL1, DL2, and DL3 through the data driving circuit 200 when a blue pattern image is displayed on the display panel DP.

Referring to FIGS. 2 and 3B, when the blue pattern image is displayed on the display panel DP, data signals to be provided to the first pixel parts R21, R41, R13, and R33 and the third pixel parts G12, G22, G32, and G42 may correspond to the lowest gradation level, and data signals to be provided to the second pixel parts B11, B31, B23 and B43 may correspond to the highest gradation level. Even in this case, the data signals D1 and D3 provided to the data lines DL1 and DL3 are changed to the highest gradation level and the lowest gradation level for every one horizontal period.

Figure 4A:
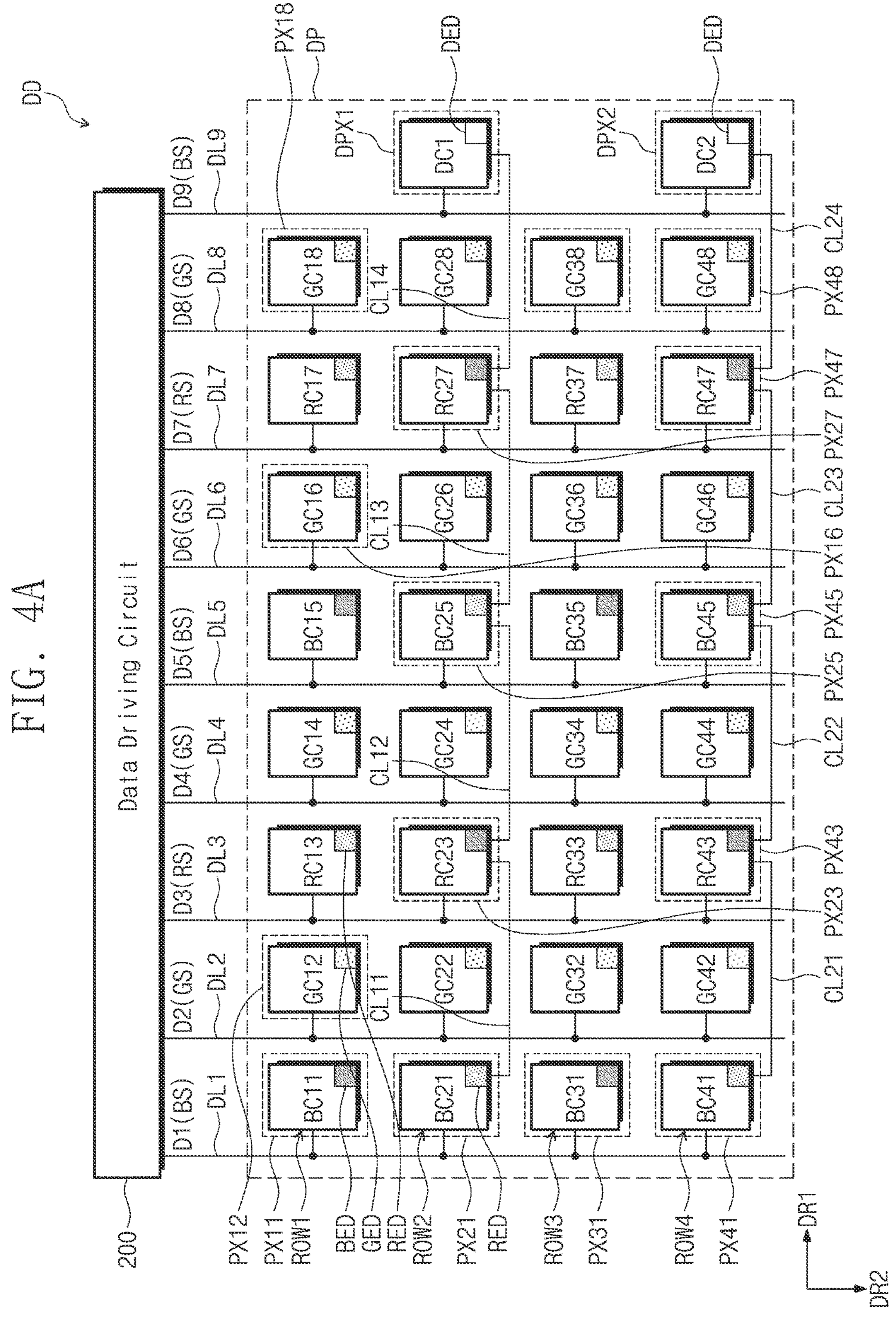
FIG. 4A is a view illustrating an example of the display device according to an embodiment of the present disclosure.

FIG. 4A is a view illustrating an example of the display device DD according to an embodiment of the present disclosure.

Referring to FIG. 4A, the display device DD includes a data driving circuit 200 and a display panel DP. The display panel DP includes pixel parts PX11 to PX48, dummy pixel parts DPX1 and DPX2, and data lines DL1 to DL9.

Although the pixel parts PX11 to PX48 corresponding to eight data lines DL1 to DL8 and the dummy pixel parts DPX1 and DPX2 corresponding to one data line DL9 are illustrated in FIG. 4A, an embodiment of the present disclosure is not limited thereto. The number of data lines disposed on the display panel DP and the number of pixel parts disposed on the display panel DP may be variously changed.

A pixel circuit and a light emitting element are disposed in each of the pixel parts PX11 to PX48, and the pixel circuit may be connected to the corresponding data line among the data lines DL1 to DL8.

Each of the pixel parts PX11 to PX48 may include a corresponding one of the pixel circuits RC13 to RC47, BC11 to BC45, and GC12 to GC48, and one light emitting element.

In addition, each of the pixel parts PX11 to PX48 may include any one of a first light emitting element RED emitting light having a red color, a second light emitting element BED emitting light having a blue color, and a third light emitting element GED emitting light having a green color. However, an embodiment of the present disclosure is not limited thereto, and each of the pixel parts PX11 to PX48 may include any one of light emitting elements emitting light having various colors such as yellow, cyan, magenta, and white.

The dummy pixel circuit DC1 and the dummy light emitting element DED are disposed in the dummy pixel parts DPX1, and the dummy pixel circuit DC2 and the dummy light emitting element DED are disposed in the dummy pixel part DPX2. Each of the dummy pixel circuits DC1 and DC2 is connected to the data line DL9.

Although not shown in the drawings, the pixel circuits arranged in the same row in the first direction DR1 among the pixel circuits RC13 to RC47, BC11 to BC45, and GC12 to GC48 may be connected to the same scan line. For example, pixel circuits BC11, GC12, RC13, GC14, BC15, GC16, RC17, and GC18 in the first row ROW1 may be commonly connected to the same scan line, and pixel circuits BC21, GC22, RC23, GC24, BC25, GC26, RC27, and GC28 in the second row ROW2 may be commonly connected to the same scan line.

Corresponding pixel circuits of the pixel circuits RC13 to RC47, BC11 to BC45, and GC12 to GC48 are connected to each of the data lines DL1 to DL8. For example, the pixel circuits BC11, BC21, BC31, and BC41 are connected to the data line DL1, and the pixel circuits GC12, GC22, GC32 and GC42 are connected to the data line DL2, and the pixel circuits RC13, RC23, RC33, and RC43 are connected to the data line DL3.

Although the pixel circuits RC13 to RC47, BC11 to BC45, and GC12 to GC48, and first to third light emitting elements RED, BED, and GED, which are illustrated in FIG. 4A, are illustrated to have the same sizes (areas), an embodiment of the present disclosure is not limited thereto. In addition, the pixel circuits RC13 to RC47, BC11 to BC45, and GC12 to GC48, and the first to third light emitting elements RED, BED, and GED may partially overlap each other in a plan view. Although each of the first to third light emitting elements RED, BED, and GED is illustrated to have the same size (area) in FIG. 4A, an embodiment of the present disclosure is not limited thereto. For example, the first light emitting element RED and the second light emitting element BED may have the same size as each other, and each of the third light emitting elements GED may have a size less than that of each of the first light emitting element RED and the second light emitting element BED.

In an embodiment, the pixel circuit and the light emitting element of each of the pixel parts in the first row ROW1 and the third row ROW3 among the pixel parts PX11 to PX48 are electrically connected to each other. For example, the pixel circuit BC11 and the second light emitting element BED of the pixel part PX11 are electrically connected to each other.

In an embodiment, the pixel circuit and the light emitting element of each of the pixel parts in the second row ROW2 and the fourth row ROW4 among the pixel parts PX11 to PX48 are electrically separated from each other. For example, the pixel circuit BC21 and the first light emitting element RED of the pixel part PX21 are electrically separated from each other.

The first light emitting element RED of each of the pixel parts PX21, PX25, PX41, and PX45 in the second row ROW2 and the fourth row ROW4 is electrically connected to corresponding one of the pixel circuits RC23, RC27, RC43, and RC47 of the pixel parts PX23, PX27, PX43, and PX47 through connection lines CL11, CL13, CL21, and CL23.

The second light emitting element BED of each of the pixel parts PX23 and PX43 in the second row ROW2 and the fourth row ROW4 is electrically connected to corresponding one of the pixel circuits BC25 and BC45 of the pixel parts PX25 and PX45 through the connection lines CL12 and CL22.

The second light emitting element BED of each of the pixel parts PX27 and PX47 in the second row ROW2 and the fourth row ROW4 is electrically connected to corresponding one of dummy pixel circuits DC1 and DC2 of dummy pixel parts DPX1 and DPX2 through connection lines CL14 and CL24. The connection lines CL14 and CL24 of the pixel parts PX27 and PX47 may be dummy connection lines connected to the dummy pixel parts DPX1 and DPX2, respectively.

In an embodiment, the dummy pixel circuit and the dummy light emitting element of each of the dummy pixel parts DPX1 and DPX2 illustrated in FIG. 4A are electrically separated from each other. For example, the dummy pixel circuit DC1 and the dummy light emitting element DED of the dummy pixel part DPX1 are electrically separated from each other, and the dummy pixel circuit DC2 and the dummy light emitting element DED of the dummy pixel part DPX2 are electrically separated from each other.

In an embodiment, each of the dummy pixel part DPX1 and the dummy pixel part DPX2 may not include the light emitting element DED.

In an embodiment, each of the data signals D1, D5, and D9 provided to the data lines DL1, DL5, and DL9 may be a second color signal BS. Each of the data signals D2, D4, D6, and D8 provided to the data lines DL2, DL4, DL6, and DL8 may be a third color signal GS. Each of the data signals D3 and D7 provided to the data lines DL3 and DL7 may be a first color signal RS.

Figure 4B:
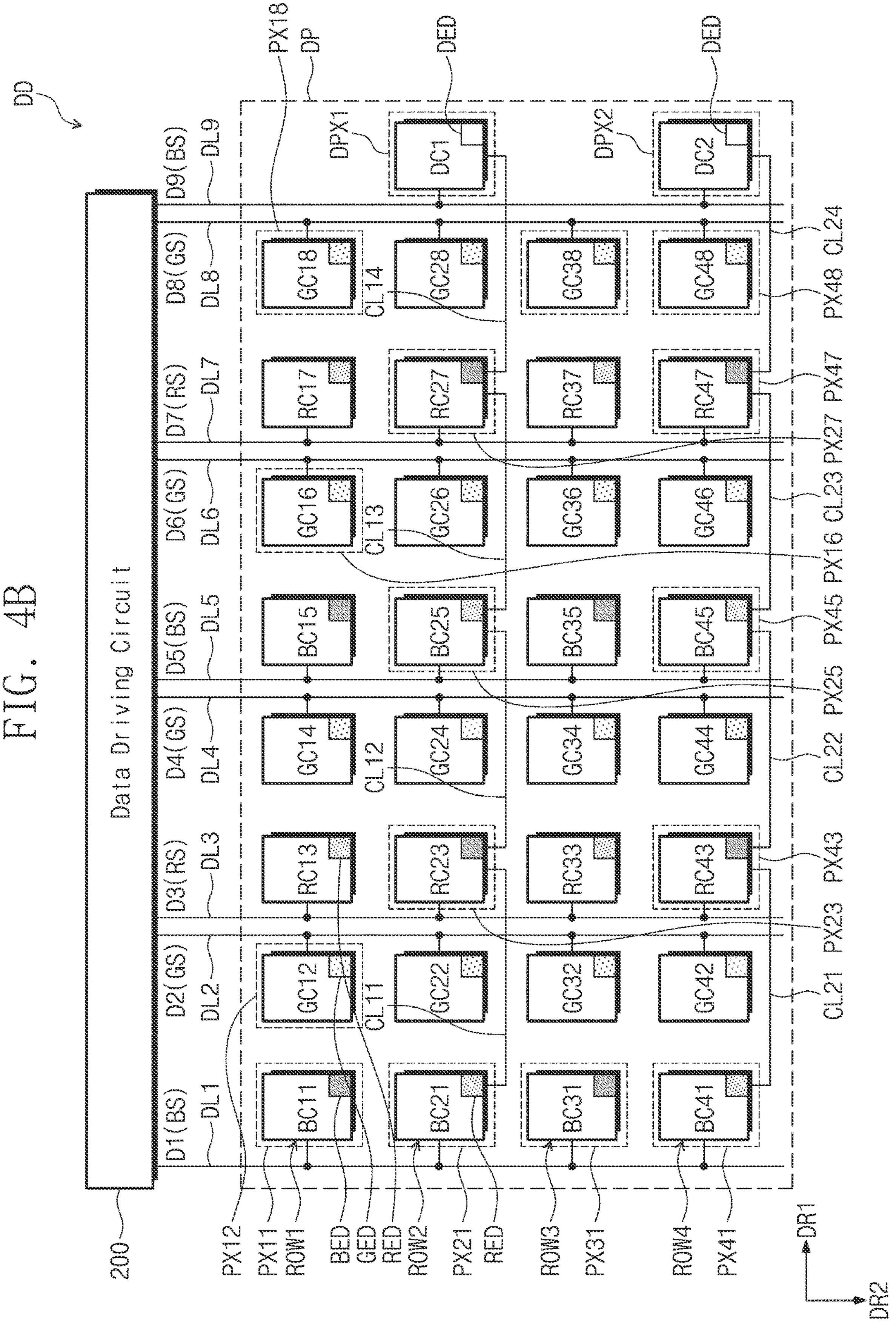
FIG. 4B is a view illustrating an example of the display device according to an embodiment of the present disclosure.

FIG. 4B is a view illustrating an example of the display device DD according to an embodiment of the present disclosure.

Referring to FIG. 4B, the display device DD includes a data driving circuit 200 and a display panel DP. The display panel DP includes pixel parts PX11 to PX48, dummy pixel parts DPX1 and DPX2, and data lines DL1 to DL9.

The pixel parts PX11 to PX48 and the dummy pixel parts DPX1 and DPX2 illustrated in FIG. 4B are similar to the pixel parts PX11 to PX48 and the dummy pixel parts DPX1 and DPX2 illustrated in FIG. 4A, and thus, duplicated descriptions thereof will be omitted.

In the data lines DL1 to DL9 illustrated in FIG. 4B, the data lines DL2 and DL3 are disposed adjacent to each other with no pixel part disposed therebetween, the data lines DL4 and DL5 are disposed adjacent to each other with no pixel part disposed therebetween, the data lines DL6 and DL7 are disposed adjacent to each other with no pixel part disposed therebetween, and the data lines DL8 and DL9 are disposed adjacent to each other with no pixel part disposed therebetween.

Each of the pixel circuits BC11, BC21, BC31, BC41, RC13, RC23, RC33, RC43, BC15, BC25, BC35, BC45, RC17, RC27, RC37, and RC47 and the dummy pixel circuits DC1 and DC2 in odd-numbered pixel columns are connected to a data line disposed on a left side of the pixel circuits among the data lines DL1 to DL9.

Each of the pixel circuits GC12 to GC48 in the even-numbered pixel columns are connected to a data line disposed on a right side of the pixel circuits among the data lines DL1 to DL9.

Figure 5A:
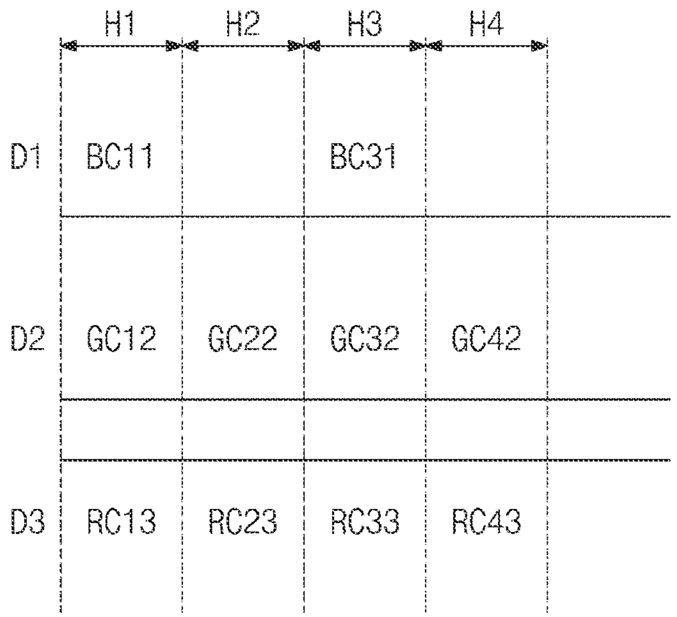
FIGS. 5A and 5B are views illustrating an example of data signals output from a data driving circuit illustrated in FIG. 4A.
Figure 5B:
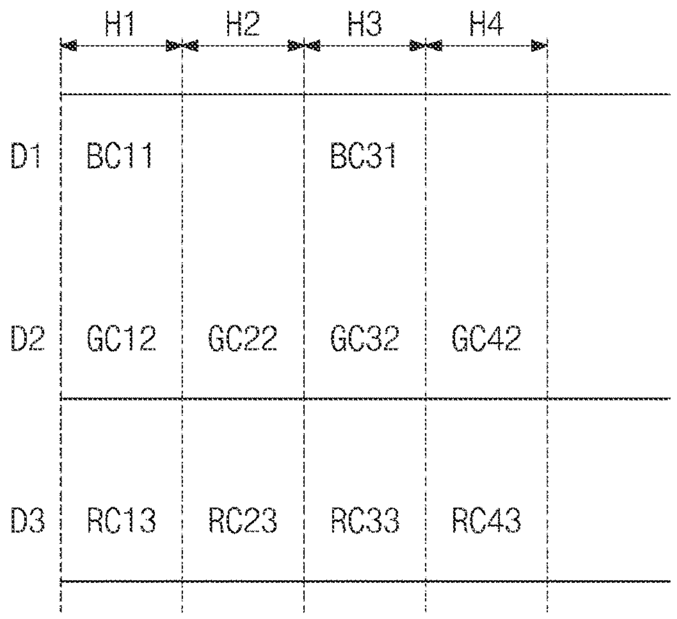

FIGS. 5A and 5B are views illustrating an example of the data signals D1, D2, and D3 output from the data driving circuit 200 illustrated in FIG. 4A.

FIG. 5A illustrates an example of the data signals D1, D2, and D3 output to data lines DL1, DL2, and DL3 through the data driving circuit 200 when the red pattern image is displayed on the display panel DP.

Referring to FIGS. 4A and 5A, the data signal D1 provided from the data driving circuit 200 to the data line DL1 is provided to the pixel circuits BC11 and BC31 in the horizontal periods H1 and H3, respectively.

The data signal D2 provided from the data driving circuit 200 to the data line DL2 is provided to the pixel circuits GC12, GC22, GC32, and GC42 in each of the horizontal periods H1, H2, H3, and H4.

The data signal D3 provided from the data driving circuit 200 to the data line DL3 is provided to the pixel circuits RC13, RC23, RC33, and RC43 in each of the horizontal periods H1, H2, H3, and H4.

As described above, the second color signal BS for the pixel circuits BC11 and BC31 is provided to the data line DL1 as the data signal D1. The third color signal GS for the pixel circuits GC12, GC22, GC32, and GC42 is provided to the data line DL2 as the data signal D2. The first color signal RS for the pixel circuits RC13, RC23, RC33, and RC43 is provided to the data line DL3 as the data signal D3.

When the red pattern image is displayed on the display panel DP, the data signals D1 and D2 provided to the data lines DL1 and DL2 may correspond to the lowest gradation level, and the data signal D3 provided to the data line DL3 may correspond to the highest gradation level.

Since the data signals D1, D2, and D3 for the pixel emitting light having the same color are provided to each of the data lines DL1, DL2, and DL3, a signal level change width and a signal level change number of the data signals D1 and D3 may be minimized to reduce the power consumption of the display device 100.

FIG. 5B illustrates an example of the data signals D1, D2, and D3 output to data lines DL1, DL2, and DL3 through the data driving circuit 200 when a blue pattern image is displayed on the display panel DP.

Referring to FIGS. 4A and 5B, when the blue pattern image is displayed on the display panel DP, the data signal D1 provided to the data line DL1 may correspond to the highest gradation level, and each of the data signals D2 and D3 provided to the data lines DL2 and DL3 may correspond to the lowest gradation level.

Since the data signals D1, D2, and D3 for the pixel emitting light having the same color are provided to each of the data lines DL1, DL2, and DL3, a signal level change width and a signal level change number of the data signals D1 and D3 may be minimized to reduce the power consumption of the display device 100.

Figure 6:
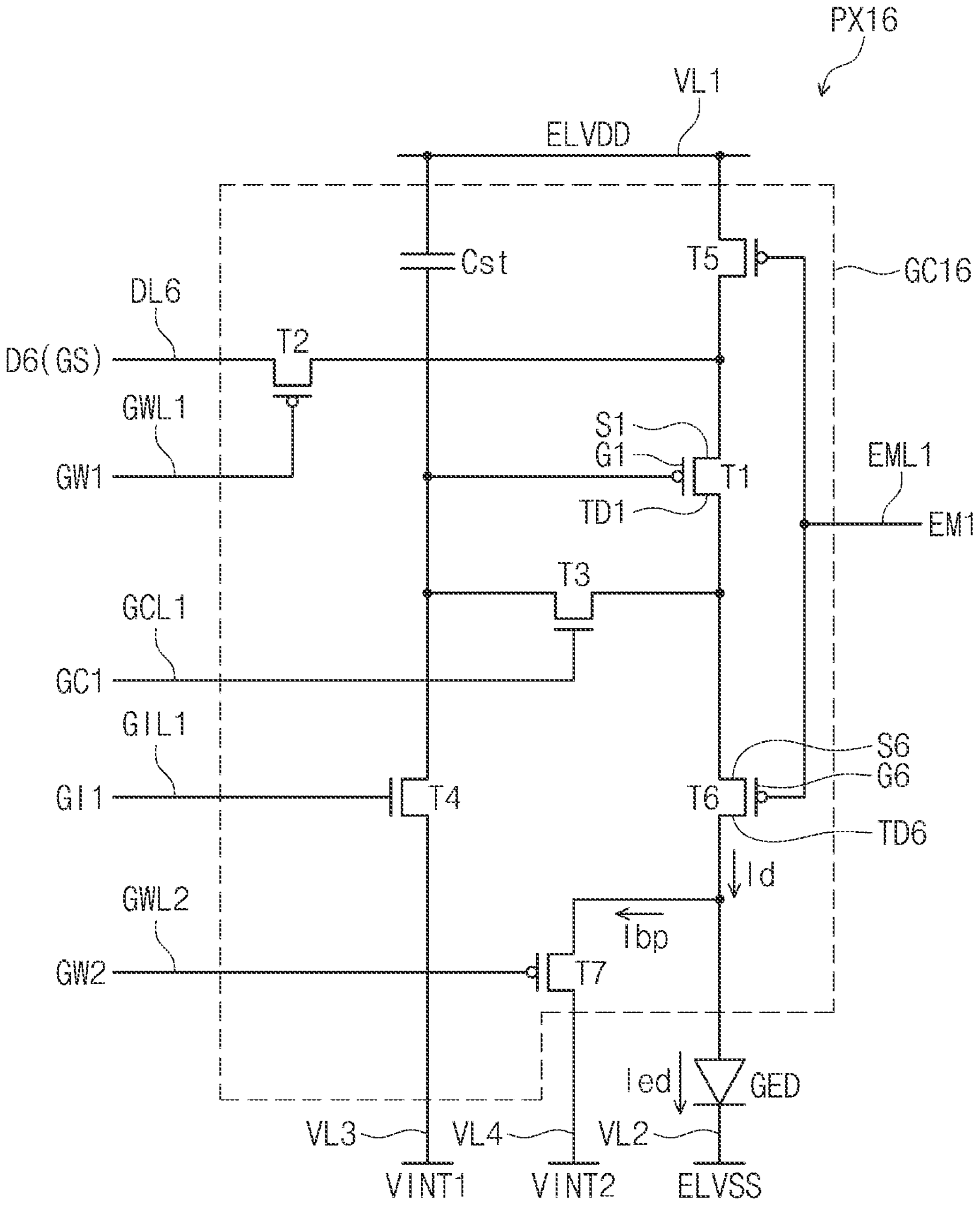
FIG. 6 is a circuit diagram illustrating a pixel disposed in a third pixel part according to an embodiment of the present disclosure.

FIG. 6 is a circuit diagram illustrating the pixel circuit GC16 and the third light emitting element GED disposed in the pixel part PX16 according to an embodiment of the present disclosure.

FIG. 6 illustrates an example of the pixel circuit GC16 and the third light emitting element GED disposed in the pixel part PX16. All the pixel circuits BC11 to GC18 arranged in the first row ROW1, all the pixel circuits BC31 to GC38 arranged in the third row ROW3, and the pixel circuits GC22, GC24, GC26, GC28, GC42, GC44, GC46, and GC48 arranged in the second row ROW2 and the fourth row ROW4, which are illustrated in FIG. 4A or 4B, may include the same circuit configuration as the pixel circuit GC16 illustrated in FIG. 6.

Referring to FIG. 6, the pixel circuit GC16 and the third light emitting element GED are disposed in the pixel part PX16. In an embodiment, the third light emitting element GED may be a light emitting diode. The third light emitting element GED disposed in the pixel part PX16 may emit light having a third color (e.g., green color).

In an embodiment, the pixel circuit GC16 may include at least one transistor and at least one capacitor. The pixel circuit GC16 illustrated in FIG. 6 includes first to seventh transistors T1, T2, T3, T4, T5, T6, and T7 and a capacitor Cst. The pixel circuit GC16 illustrated in FIG. 6 is merely an example, and the configuration of the pixel circuit GC16 may be modified.

In this embodiment, the third and fourth transistors T3 and T4 among the first to seventh transistors T1 to T7 are N-type transistors using an oxide semiconductor as a semiconductor layer, and each of the first, second, and fifth, sixth, and seventh transistors T1, T2, T5, T6, and T7 is a P-type transistor having a low-temperature polycrystalline silicon (LTPS) semiconductor layer. However, an embodiment of the present disclosure is not limited thereto, and each of the first to seventh transistors T1 to T7 may be the P-type transistor or the N-type transistor. In another embodiment, at least one of the first to seventh transistors T1 to T7 may be the N-type transistor, and the other may be the P-type transistor.

In an embodiment, the pixel circuit GC16 may be electrically connected to one data line DL6, four scan lines GIL1, GCL1, GWL1, GWL2, and one emission control line EML1.

The scan lines GIL1, GCL1, GWL1, and GWL2 may transmit the scan signals GI1, GC1, GW1, and GW2, respectively, and the emission control line EML1 may transmit the emission control signal EM1. The data line DL6 transmits the data signal D6. The data signal D6 may have a voltage level corresponding to the input image signal RGB inputted to the display device DD (see FIG. 1). The first to fourth driving voltage lines VL1, VL2, VL3, and VL4 may transmit a first driving voltage ELVDD, a second driving voltage ELVSS, a first initialization voltage VINT1, and a second initialization voltage VINT2.

The first transistor T1 includes a first electrode S1 connected to the first driving voltage line VL1 via the fifth transistor T5, a second electrode TD1 electrically connected to an anode of the third light emitting element GED via the sixth transistor T6, and a gate electrode G1 connected to one end of the capacitor Cst. The first transistor T1 may receive the data signal D6 transmitted from the data line DL6 in response to a switching operation of the second transistor T2 to supply driving current Id to the third light emitting element GED.

The second transistor T2 includes a first electrode connected to the data line DL6, a second electrode connected to the first electrode S1 of the first transistor T1, and a gate electrode connected to the scan line GWL1. The second transistor T2 may be turned on in response to the scan signal GW1 transmitted through the scan line GWL1 to transmit the data signal D6 transmitted from the data line DL6 to the first electrode S1 of the first transistor T1. The data signal D6 transferred from the data line DL6 may be a third color signal GS.

The third transistor T3 includes a first electrode connected to the gate electrode G1 of the first transistor T1, a second electrode connected to the second electrode TD1 of the first transistor T1, and a gate electrode connected to the scan line GCL1. The third transistor T3 may be turned on in response to the scan signal GC1 received through the scan line GCL1 to connect the gate electrode G1 and the second electrode TD1 of the first transistor T1 to each other, thereby diode-connecting the first transistor T1.

The fourth transistor T4 includes a first electrode connected to the gate electrode G1 of the first transistor T1, a second electrode connected to the third driving voltage line VL3 to which the first initialization voltage VINT1 is transmitted, and a gate electrode connected to the scan line GIL1, The fourth transistor T4 is turned on in response to the scan signal GI1 transmitted through the scan line GIL1 to transmit the first initialization voltage VINT1 to the gate electrode G1 of the first transistor T1, thereby performing an initialization operation for initializing a voltage of the gate electrode G1 of the first transistor T1.

The fifth transistor T5 includes a first electrode connected to the first driving voltage line VL1, a second electrode connected to the first electrode S1 of the first transistor T1, and a gate electrode connected to the emission control line EML1.

The sixth transistor T6 includes a first electrode S6 connected to the second electrode TD1 of the first transistor T1, a second electrode TD6 connected to the anode of the third light emitting element GED, and a gate electrode G6 connected to the emission control line EML1.

The fifth transistor T5 and the sixth transistor T6 may be turned on at the same time in response to the emission control signal EM1 transmitted through the emission control line EML1, and thus, the first driving voltage ELVDD may be transmitted to the third light emitting element GED and a current Ied may pass through the third light emitting element GED.

The seventh transistor T7 includes a first electrode connected to the second electrode TD6 of the sixth transistor T6, a second electrode connected to the fourth driving voltage line VL4, and a gate electrode connected to the scan line GWL2. The seventh transistor T7 is turned on in response to the scan signal GW2 transmitted through the scan line GWL2 to bypass current of the anode of the third light emitting element GED to the fourth driving voltage line VL4, as shown in FIG. 6, the bypassed current is Ibp.

As described above, one end of the capacitor Cst is connected to the gate electrode G1 of the first transistor T1 and the other end of the capacitor Cst is connected to the first driving voltage line VL1. A cathode of the third light emitting element GED may be connected to the second driving voltage line VL2 that transmits the second driving voltage ELVSS.

Figure 7:
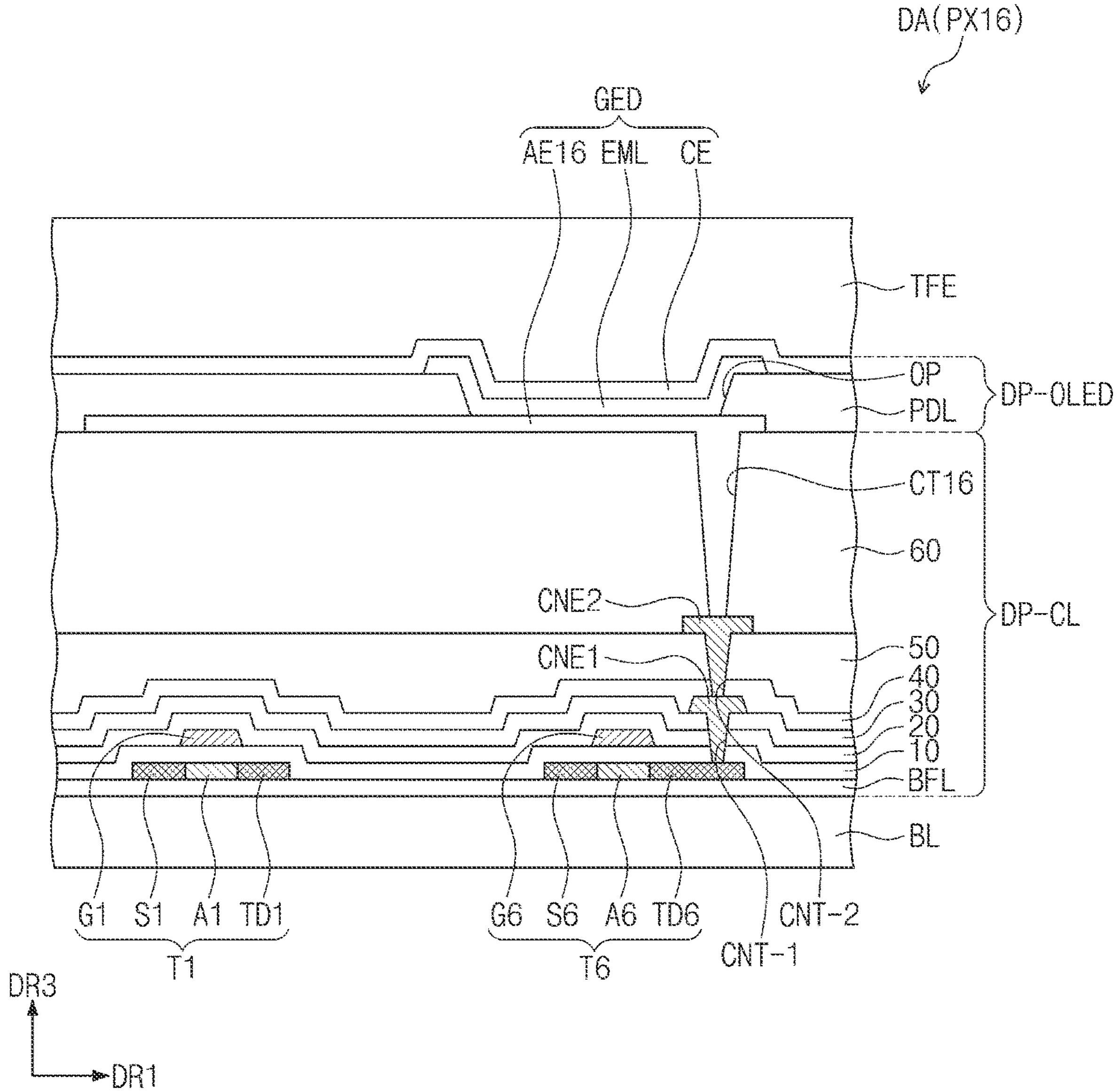
FIG. 7 is a cross-sectional view illustrating a display area of a display panel according to an embodiment of the present disclosure.

FIG. 7 is a cross-sectional view illustrating the display area DA of the display panel DP according to an embodiment of the present disclosure. FIG. 7 is a cross-sectional view illustrating portions corresponding to the first transistor T1 and the sixth transistor T6 of the pixel part PX16 illustrated in FIG. 6.

Referring to FIG. 7, the display panel DP may include a base layer BL, a circuit element layer DP-CL disposed on the base layer BL, a display element layer DP-OLED, and a thin film encapsulation layer TFE. The display panel DP may further include functional layers such as a refractive index adjustment layer. The circuit element layer DP-CL includes at least a plurality of insulating layers and a circuit element. Hereinafter, the insulating layers may include an organic layer and/or an inorganic layer.

The insulating layer, the semiconductor layer, and the conductive layer may be formed through processes such as coating, deposition, and the like. Thereafter, the insulating layer, the semiconductor layer, and the conductive layer may be selectively patterned through photolithography processes. A semiconductor pattern, a conductive pattern, a signal line, and the like are formed through the process. The patterns disposed on the same layer are formed through the same process.

The base layer BL may include a synthetic resin layer. The synthetic resin layer may include a thermosetting resin. Particularly, the synthetic resin layer may be a polyimide resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In addition, the base layer BL may include a glass substrate, a metal substrate, or an organic/inorganic composite substrate.

At least one inorganic layer may be disposed on a top surface of the base layer BL. The inorganic layer may include at least one of aluminum oxide, titanium oxide, silicon oxide, silicon oxide nitride, zirconium oxide, and hafnium oxide. The inorganic layer may be provided as a multilayer. At least one of the multi-layered inorganic layers may constitute a buffer layer BFL.

The buffer layer BFL improves bonding force between the base layer BL and the semiconductor pattern and/or the conductive pattern. The buffer layer BFL may include a silicon oxide layer and a silicon nitride layer. The silicon oxide layer and the silicon nitride layer may be alternately laminated.

The semiconductor pattern is disposed on the buffer layer BFL. The semiconductor pattern may be directly disposed on the buffer layer BFL. The semiconductor pattern may include a silicon semiconductor. The semiconductor pattern may include low-temperature polycrystalline silicon (LTPS). However, the embodiment of the present disclosure is not limited thereto, and the semiconductor pattern may include amorphous silicon.

The semiconductor pattern has different electrical properties depending on a concentration of impurities in the semiconductor pattern. The semiconductor pattern may include a doped region and a non-doped region. The doped region may be doped with an N-type dopant or a P-type dopant. The P-type transistor includes a doped region doped with the P-type dopant.

The doped region may have conductivity greater than that of a non-doped region and substantially serve as an electrode or a signal line. The non-doped region may substantially correspond to an active (or channel) region of the transistor. In other words, a portion of the semiconductor pattern may be an active region of the transistor, the other portion may be a first electrode (source electrode) or a second electrode (drain electrode) of the transistor, and the remainder may be a connection electrode or a connection signal line.

As illustrated in FIG. 7, the first electrode S1, the active region A1, and the second electrode TD1 of the first transistor T1 are formed from the semiconductor pattern. The first electrode S1 and the second electrode TD1 of the first transistor T1 extend from the active region A1 in direction opposite to each other. Also, the first electrode S6, the active region A6, and the second electrode TD6 of the sixth transistor T6 are formed from the semiconductor pattern. The first electrode S6 and the second electrode TD6 of the sixth transistor T6 extend from the active region A6 in directions opposite to each other. Although not shown separately, the first electrode S6 of the sixth transistor T6 may be connected to the second electrode TD1 of the first transistor T1.

As illustrated in FIG. 6, the first electrode S6 of the sixth transistor T6 may be electrically connected to the second electrode TD1 of the first transistor T1.

A first insulating layer 10 is disposed on the buffer layer BFL. The first insulating layer 10 commonly overlaps the pixel parts PX11 to PX48 illustrated in FIG. 4A or 4B and covers the semiconductor pattern. The first insulating layer 10 may include an inorganic layer and/or an organic layer and have a single-layered or multilayered structure. The first insulating layer 10 may include at least one of aluminum oxide, titanium oxide, silicon oxide, silicon oxide nitride, zirconium oxide, and hafnium oxide. In this embodiment, the first insulating layer 10 may be a single-layered silicon oxide layer. The insulating layer of the circuit element layer DP-CL, which will be described later, as well as the first insulating layer 10 may be an inorganic layer and/or an organic layer and may have a single-layered or a multi-layered structure. The inorganic layer may include at least one of the above-described materials.

The gate electrode G1 of the first transistor T1 is disposed on the first insulating layer 10. The gate electrode G1 may be a portion of a metal pattern. The gate electrode G1 of the first transistor T1 overlaps the active region A1 of the first transistor T1. In the process of doping the semiconductor pattern, the gate electrode G1 of the first transistor T1 serves as a self-aligned mask.

A second insulating layer 20 covering the gate electrode G1 is disposed on the first insulating layer 10. The second insulating layer 20 commonly overlaps the pixel parts PX11 to PX48 (see FIG. 4A). The second insulating layer 20 may be an inorganic layer and/or an organic layer and have a single-layered or multilayered structure. In this embodiment, the second insulating layer 20 may include a single-layered silicon oxide layer.

The third insulation layer 30 is disposed on the second insulation layer 20. In this embodiment, the third insulating layer 30 may include a single-layered silicon oxide layer.

The first connection electrode CNE1 may be disposed on the third insulating layer 30. The first connection electrode CNE1 may be connected to the second electrode TD6 of the sixth transistor T6 through a contact hole CNT-1 passing through the first to third insulating layers 10 to 30.

A fourth insulation layer 40 covering the first connection electrode CNE1 may be disposed on the third insulation layer 30. The fourth insulating layer 40 may be a single-layered silicon oxide layer. The fifth insulating layer 50 is disposed on a fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 covering the second connection electrode CNE2 is disposed on the fifth insulating layer 50. The sixth insulating layer 60 may be an organic layer. An anode AE16 of the third light emitting element GED is disposed on the sixth insulating layer 60. The anode AE16 is connected to the second connection electrode CNE2 through a connection node CT16 passing through the sixth insulating layer 60. A pixel defining layer PDL is disposed on the sixth insulating layer 60. An opening OP is defined in the pixel defining layer PDL. The opening OP of the pixel defining layer PDL exposes at least a portion of the anode AE16.

An emission layer EML is disposed on the anode AE16. The emission layer EML may be disposed in only an area corresponding to the opening OP. The emission layer EML may be provided separately in each of the pixel parts PX11 to PX48.

Although the patterned emission layer EML is illustrated as an example in this embodiment, the emission layer EML may be commonly disposed in the pixel parts PX11 to PX48 (see FIG. 4A). In this case, the emission layer EML may generate white light or blue light. Also, the emission layer EML may have a multilayer structure. A cathode CE of the third light emitting element GED is disposed on the emission layer EML. The cathode CE is commonly disposed in the pixel parts PX11 to PX48.

Although not shown in the drawings, a hole control layer may be disposed between the anode AE16 and the emission layer EML. Also, an electronic control layer may be disposed between the emission layer EML and the cathode CE.

The thin film encapsulation layer TFE is disposed on the cathode CE. The thin film encapsulation layer TFE is commonly disposed in the pixel parts PX11 to PX48 (see FIG. 4A). In the current embodiment, the thin film encapsulation layer TFE directly covers the cathode CE. In this embodiment of the present disclosure, a capping layer directly covering the cathode CE may be further disposed.

The thin film encapsulation layer TFE includes at least an inorganic layer or organic layer. In an embodiment of the present disclosure, the thin film encapsulation layer TFE may include two inorganic layers and an organic layer disposed between the two inorganic layers. In an embodiment of the present disclosure, the thin film encapsulation layer TFE may include a plurality of inorganic layers and a plurality of organic layers which are alternately laminated.

The inorganic layer protects the third light emitting element GED from moisture/oxygen, and the organic layer protects the third light emitting element GED from foreign substances such as dust particles. The inorganic layer may include a silicon nitride layer, a silicon oxy nitride layer, a silicon oxide layer, a titanium oxide layer, or an aluminum oxide layer, but is not limited thereto. The organic layer may include an acrylic-based organic layer, but is not specifically limited thereto.

Figure 8A:
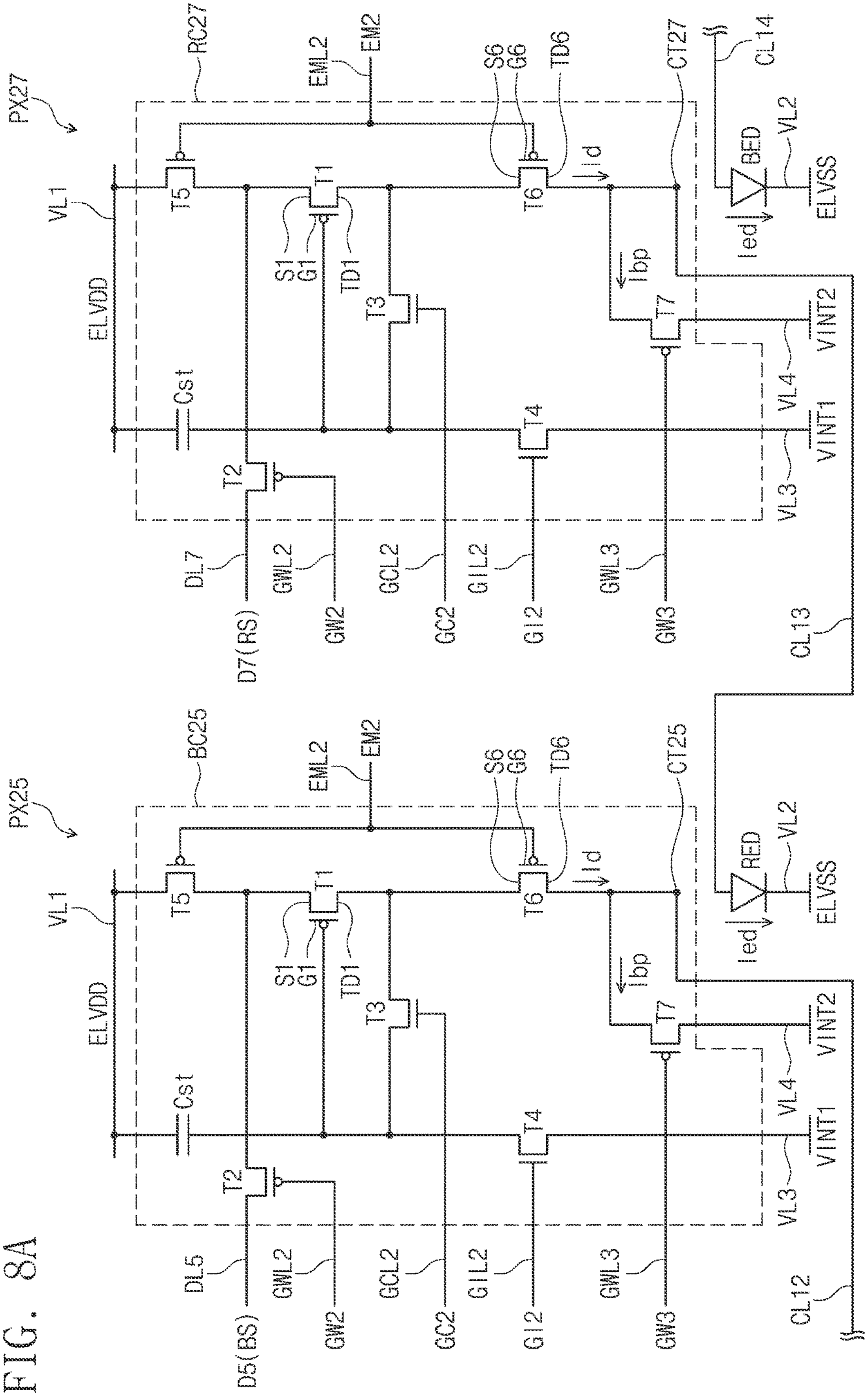
FIG. 8A is a circuit diagram illustrating pixel parts according to an embodiment of the present disclosure.

FIG. 8A is a circuit diagram illustrating a pixel part PX25 and a pixel part PX27 according to an embodiment of the present disclosure.

Referring to FIG. 8A, the pixel part PX25 includes a pixel circuit BC25 and a first light emitting element RED, and the pixel part PX27 includes a pixel circuit RC27 and a second light emitting element BED.

Each of the pixel circuits BC21, RC23, BC25, and RC27 arranged in the second row ROW2 illustrated in FIG. 4A and the pixel circuits BC41, RC43, BC45 and RC47 arranged in the fourth row ROW4 may include a circuit configuration similar to that of the pixel circuit BC25 and the pixel circuit RC27 illustrated in FIG. 8A.

Each of the pixel circuit BC25 of the pixel part PX25 and the pixel circuit RC27 of the pixel part PX27 illustrated in FIG. 8A may include a circuit configuration similar to that of the pixel circuit GC16 of the pixel part PX16 illustrated in FIG. 6. Among the pixel circuit BC25 of the pixel part PX25 and the pixel circuit RC27 of the pixel part PX27, the same elements as the pixel circuit GC16 of the pixel part PX16 are denoted by the same reference numerals, and duplicated descriptions thereof will be omitted.

Referring to FIG. 8A, the first light emitting element RED disposed in the pixel part PX25 may be a light emitting element emitting light having a first color (e.g., red color). In an embodiment, the pixel circuit BC25 and the first light emitting element RED of the pixel part PX25 are electrically separated from each other.

In an embodiment, the pixel circuit BC25 of the pixel part PX25 may be electrically connected to one data line DL5, four scan lines GIL2, GCL2, GWL2, and GWL3, and one emission control line EML2.

As described with reference to FIG. 4A, the data signal D5 transmitted to the pixel circuit BC25 of the pixel part PX25 through the data line DL5 may be a second color signal BS for the second light emitting element BED in the pixel part PX23. The pixel circuit BC25 of the pixel part PX25 is electrically connected to the second light emitting element BED of the pixel part PX23 illustrated in FIG. 4A through a connection node CT25 and a connection line CL12. Therefore, driving current Id corresponding to the data signal D5 may be provided to the second light emitting element BED of the pixel part PX23 through the connection line CL12. That is, the pixel circuit BC25 of the pixel part PX25 and the second light emitting element BED of the pixel part PX23 may substantially constitute one pixel.

The pixel part PX27 includes a pixel circuit RC27 and a second light emitting element BED. The second light emitting element BED included in the pixel part PX27 may be a light emitting element that emits light having a second color (e.g., blue color). In an embodiment, the pixel circuit RC27 and the second light emitting element BED of the pixel part PX27 are electrically separated from each other.

In an embodiment, the pixel circuit RC27 of the pixel part PX27 may be electrically connected to one data line DL7, four scan lines GIL2, GCL2, GWL2, and GWL3, and one emission control line EML2.

The data signal D7 transmitted to the pixel circuit RC27 of the pixel part PX27 through the data line DL7 may be the first color signal RS as described with reference to FIG. 4A. However, since the pixel part PX27 includes the second light emitting element BED, the pixel circuit RC27 of the pixel part PX27 may be electrically separated from the second color light emitting element BED so that the data signal D7 is not transmitted to the second light emitting element BED.

In an embodiment, the connection line CL13 is electrically connected to the connection node CT27 of the pixel circuit RC27 in the pixel part PX27. Therefore, driving current Id corresponding to the data signal D7 may be provided to the first light emitting element RED of the pixel part PX25 through the connection line CL13. That is, the pixel circuit RC27 of the pixel part PX27 and the first light emitting element RED of the pixel part PX25 may substantially constitute one pixel.

The second light emitting element BED of the pixel part PX27 may be electrically connected to the dummy pixel circuit DC1 of the dummy pixel part DPX1 illustrated in FIG. 4A through the connection line CL14.

Figure 8B:
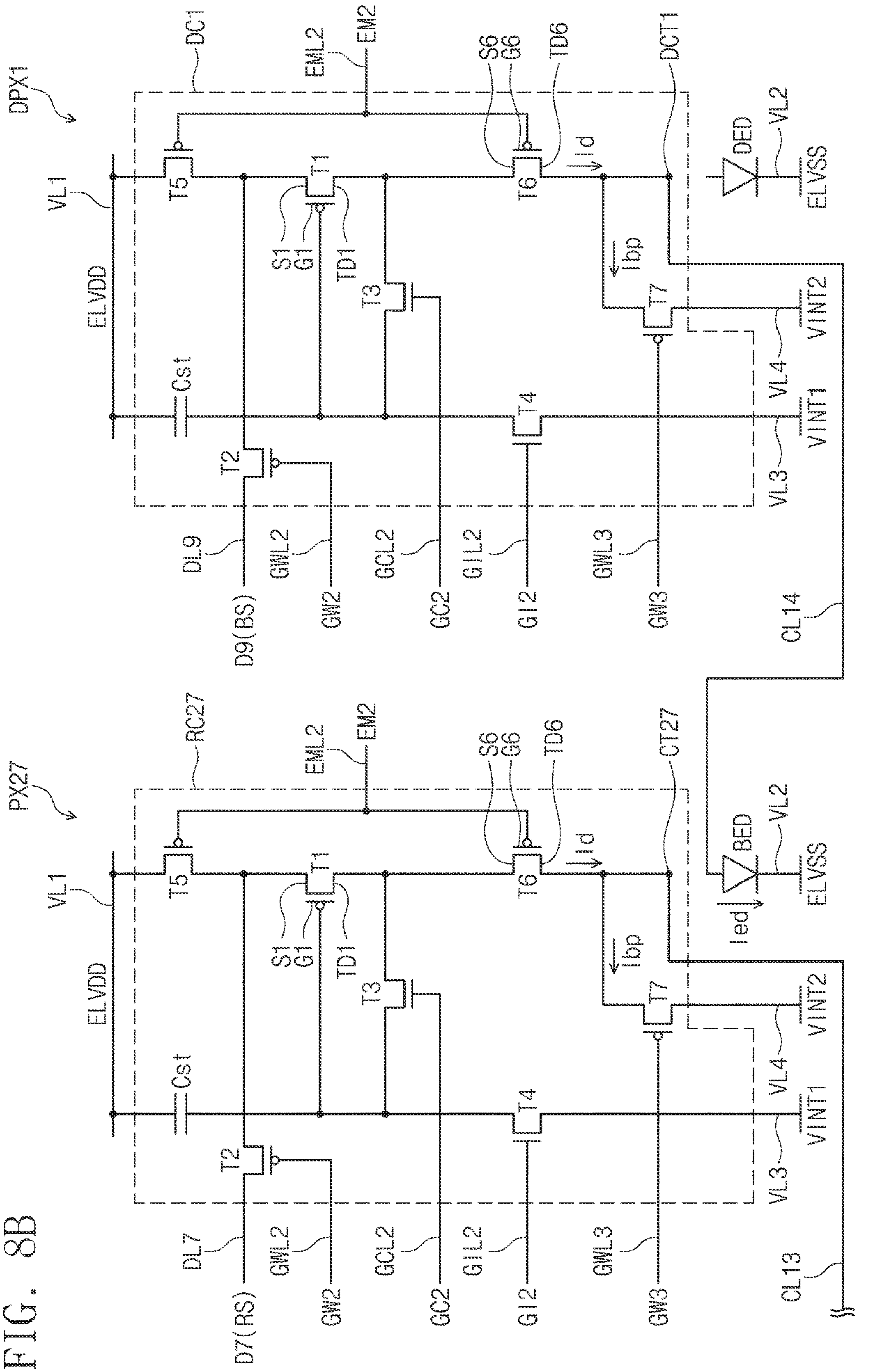
FIG. 8B is a circuit diagram illustrating a pixel part and a dummy pixel part according to an embodiment of the present disclosure.

FIG. 8B is a circuit diagram illustrating the pixel part PX27 and the dummy pixel part DPX1 according to an embodiment of the present disclosure.

A circuit configuration similar to that of the dummy pixel part DPX1 illustrated in FIG. 8B may be disposed in the dummy pixel part DPX2 illustrated in FIG. 4A.

A circuit arrangement of the pixel part PX27 illustrated in FIG. 8B is the same as that illustrated in FIG. 8A, and thus, duplicated descriptions thereof will be omitted. Since the dummy pixel circuit DC1 disposed in the dummy pixel part DPX1 is similar to the pixel circuit RC27 disposed in the pixel part PX27, duplicated description thereof will be omitted.

Referring to FIG. 8B, a dummy pixel circuit DC1 and a dummy light emitting element DED are disposed in the dummy pixel part DPX1. The dummy light emitting element DED disposed in the dummy pixel part DPX1 may not be electrically connected to the dummy pixel circuit DC1. Therefore, a color of the dummy light emitting element DED may be any color. In an embodiment, only the dummy pixel circuit DC1 may be disposed in the dummy pixel part DPX1 and the dummy light emitting element DED may not be disposed in the dummy pixel part DPX1.

A data signal D9 transmitted to the dummy pixel circuit DC1 of the dummy pixel part DPX1 through the data line DL9 may be the second color signal BS.

In an embodiment, the connection line CL14 electrically connects the second light emitting element BED in the pixel part PX27 to a dummy connection node DCT1 of the dummy pixel circuit DC1. Therefore, driving current Id corresponding to the data signal D9 may be provided to the second light emitting element BED of the pixel part PX27 through the connection line CL14. That is, the dummy pixel circuit DC1 of the dummy pixel part DPX1 and the second light emitting element BED of the pixel part PX27 may substantially constitute one pixel.

Figure 9:
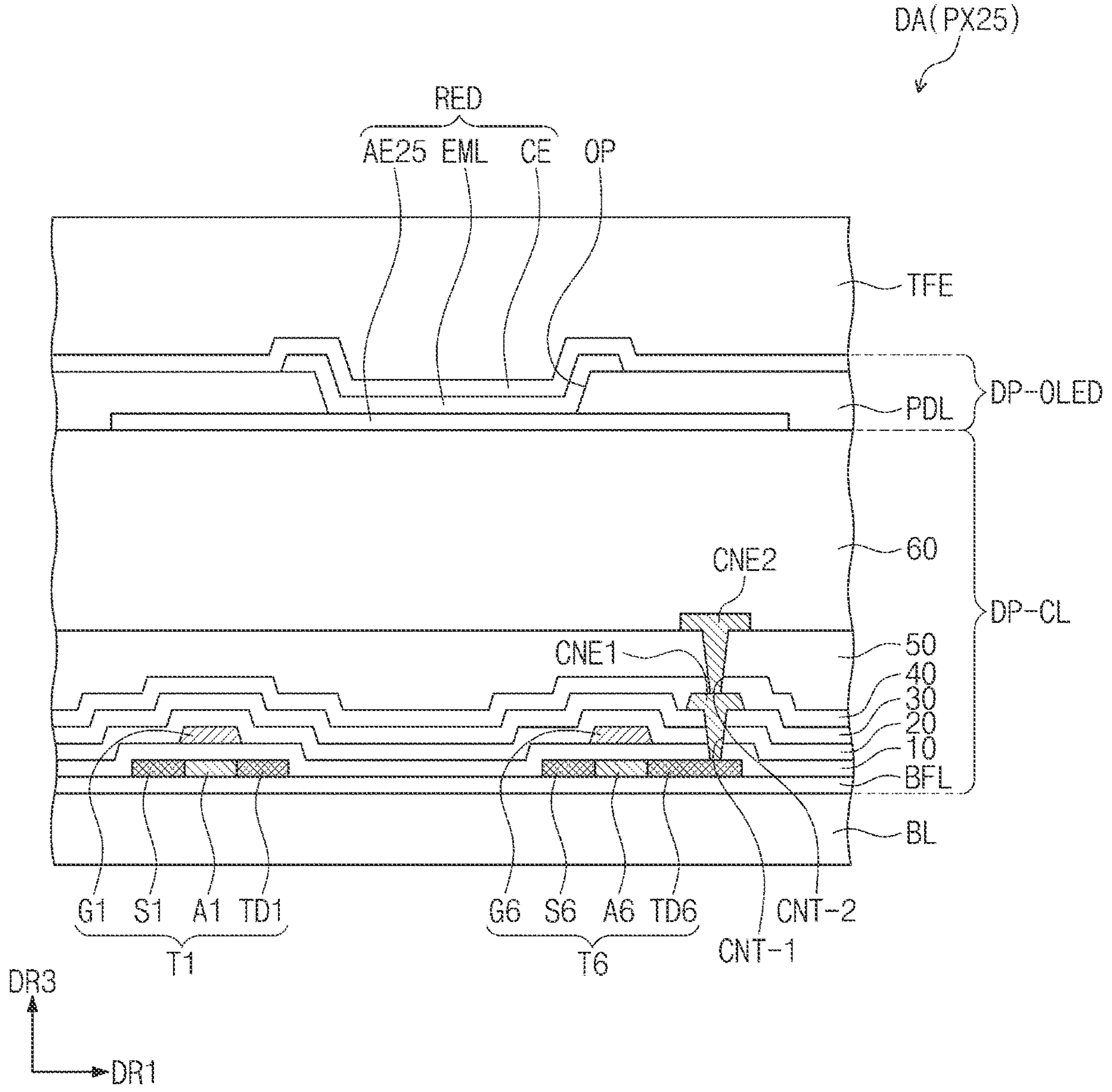
FIG. 9 is a cross-sectional view illustrating a display area of the display panel according to an embodiment of the present disclosure.

FIG. 9 is a cross-sectional view illustrating a display area DA of the display panel DP according to an embodiment of the present disclosure. FIG. 9 is a cross-sectional view illustrating portions corresponding to the first transistor T1 and the sixth transistor T6 of the pixel part PX25 illustrated in FIG. 8A.

The first transistor T1 and the sixth transistor T6 of the pixel part PX25 illustrated in FIG. 9 may include a configuration similar to that of the first transistor T1 and the sixth transistor T6 of the pixel part PX16 illustrated in FIG. 7. Therefore, duplicated descriptions thereof will be omitted.

The anode AE16 of the third light emitting element GED of the pixel part PX16 illustrated in FIG. 7 is connected to the second connection electrode CNE2 through the connection node CT16 passing through the sixth insulating layer 60. Therefore, the anode AE16 of the third light emitting element GED of the pixel part PX16 may be electrically connected to the second electrode TD6 of the sixth transistor T6 through the second connection electrode CNE2 and the first connection electrode CEN1.

Unlike the pixel part PX16 illustrated in FIG. 7, the pixel part PX25 illustrated in FIG. 9 may not include a configuration that connects the anode AE25 to the second connection electrode CNE2. Therefore, as illustrated in FIG. 9, the anode AE25 of the first light emitting element RED of the pixel part PX25 is not electrically connected to the second electrode TD6 of the sixth transistor T6.

Figure 10A:
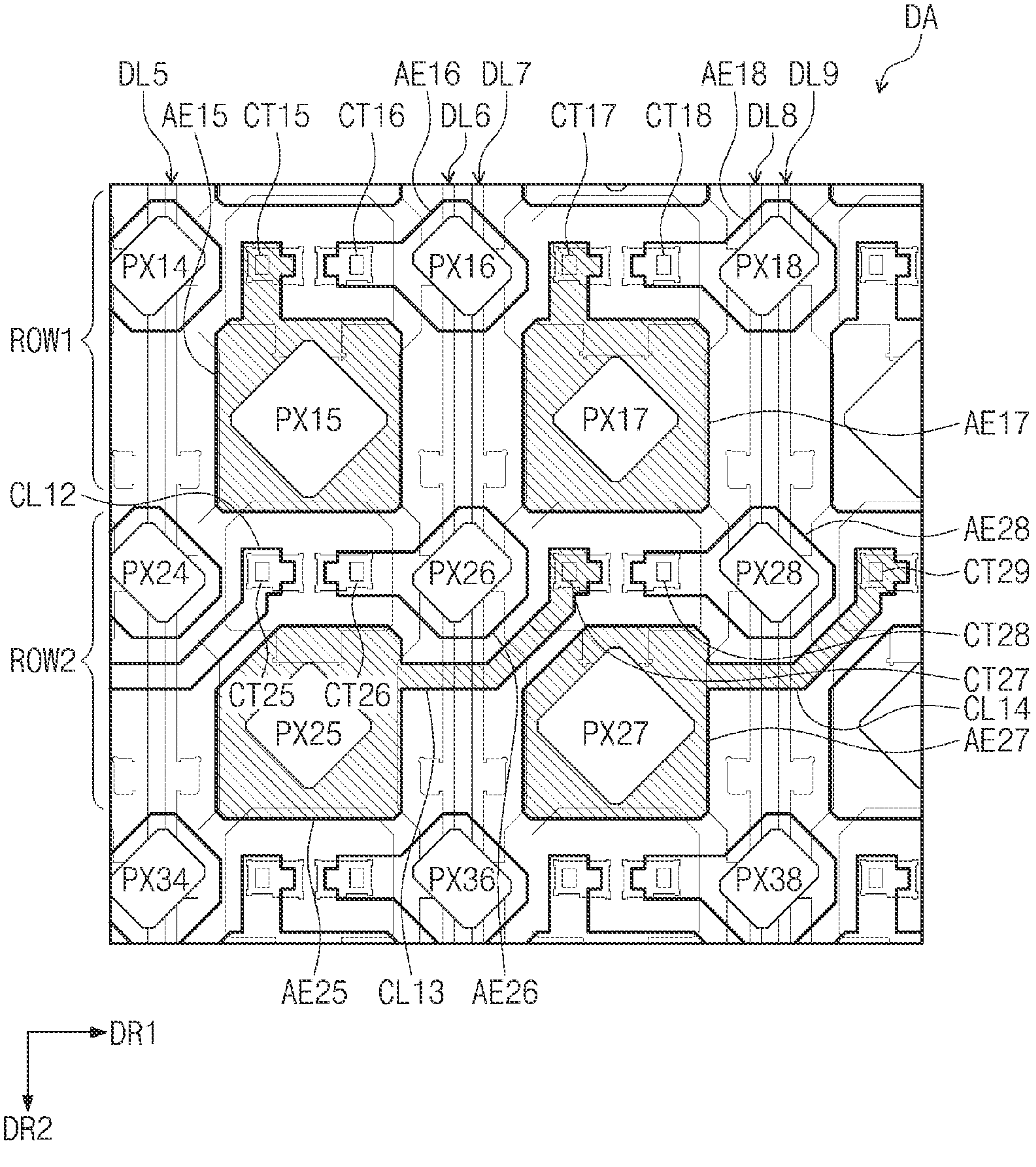
FIG. 10A is a plan view illustrating the display area of the display panel according to an embodiment of the present disclosure.

FIG. 10A is a plan view illustrating the display area DA of the display panel according to an embodiment of the present disclosure.

FIG. 10A illustrates only a portion of the pixel parts illustrated in FIG. 4A. The plan view illustrated in FIG. 10A is merely an example, and an embodiment of the present disclosure is not limited thereto.

Referring to FIG. 10A, the anodes AE15, AE16, AE17, and AE18 of the light emitting elements of the pixel parts PX15, PX16, PX17, and PX18 arranged in the first row ROW1 may be electrically connected to the second electrode TD6 of the sixth transistor T6 through the connection nodes CT15, CT16, CT17, and CT18, as illustrated in FIGS. 6 and 7.

The anodes AE26 and AE28 of the light emitting elements of the pixel parts GC26 and GC28 arranged in the second row ROW2 may be electrically connected to the second electrode TD6 of the sixth transistor T6 through the connection nodes CT26 and CT28, as illustrated in FIGS. 6 and 7.

In an embodiment, the connection line CL13 may be provided to extend from the anode AE25 of the light emitting element of the pixel part PX25 arranged in the second row ROW2. The connection line CL13 electrically connects the anode AE25 of the light emitting element of the pixel part PX25 to the connection node CT27. Therefore, as illustrated in FIGS. 4A and 8A, the anode AE25 of the light emitting element of the pixel part PX25 may be electrically connected to the second electrode TD6 of the transistor T6 in the pixel circuit RC27 of the pixel part PX27 through the connection line CL13 and the connection node CT27. However, an embodiment of the present disclosure is not limited thereto. If the pixel circuit RC27 has a circuit configuration different from that of the pixel circuit RC27 illustrated in FIG. 8A, the anode AE25 of the light emitting element of the pixel part PX25 may be electrically connected to an appropriate position in the pixel circuit RC27.

The anode AE27 of the light emitting element of the pixel part PX27 arranged in the second row ROW2 is connected to the connection node CT29 through the connection line CL14 extending from the anode AE27. Therefore, as illustrated in FIGS. 4A and 8B, the anode AE27 of the light emitting element of the pixel part PX27 may be electrically connected to the second electrode TD6 of the sixth transistor T6 in the dummy pixel circuit DC1 of the dummy pixel part DPX1.

Figure 10B:
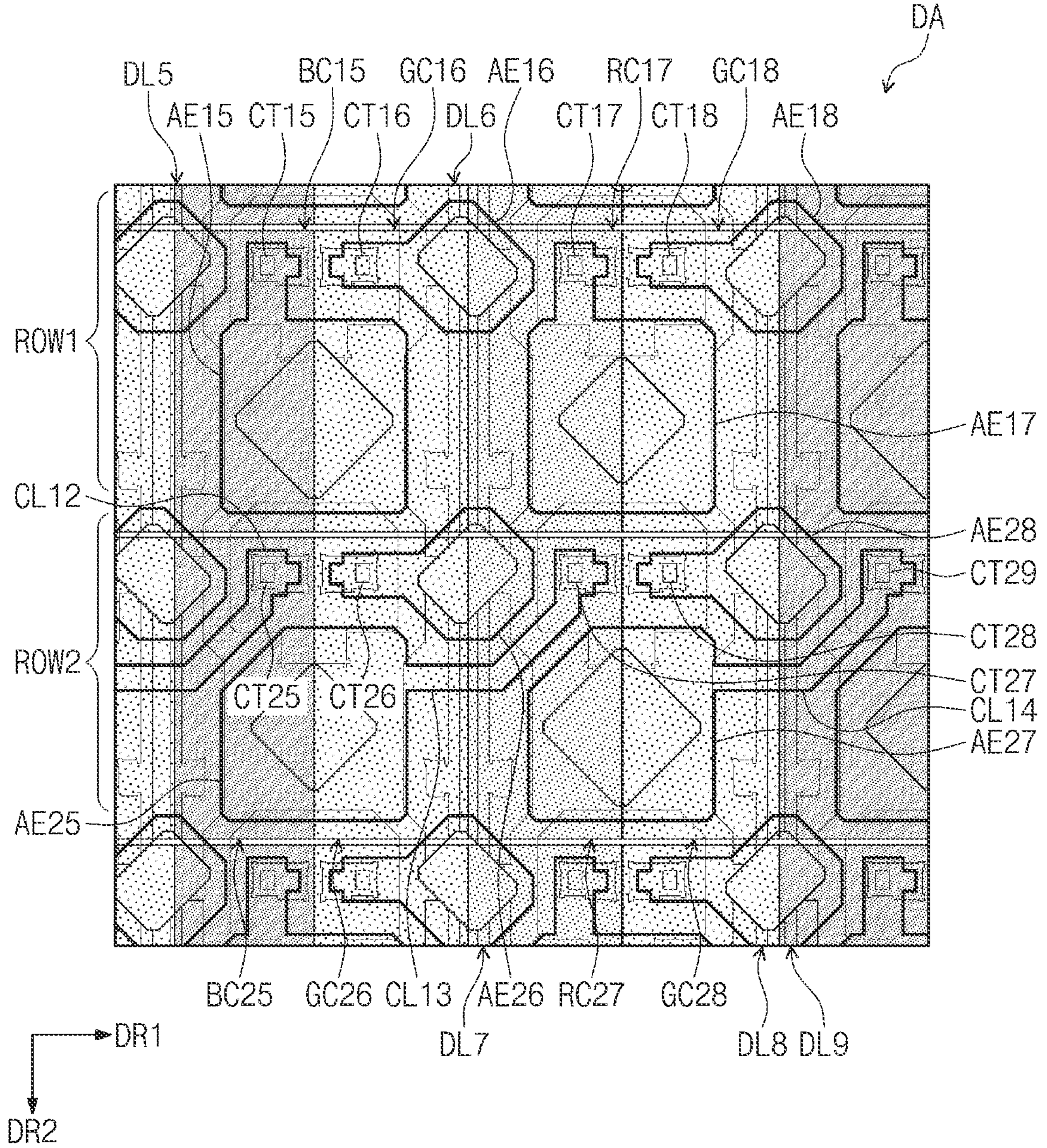
FIG. 10B is a plan view illustrating a display area of the display panel according to an embodiment of the present disclosure.

FIG. 10B is a plan view illustrating the display area DA of the display panel according to an embodiment of the present disclosure.

Referring to FIGS. 4A and 10B, in the first row ROW1, the pixel circuits BC15, GC16, RC17, and GC18 are sequentially arranged in the first direction DR1. In the second row ROW2, the pixel circuits BC25, GC26, RC27, GC28, and DC1 are sequentially arranged in the first direction DR1.

The data lines DL5 to DL9 may extend in the second direction DR2 and may be disposed to be spaced apart from each other in the first direction DR1.

The pixel circuits BC15 and BC25 may be electrically connected to the data line DL5. The pixel circuits GC16 and GC26 may be electrically connected to the data line DL6. The pixel circuits RC17 and RC27 may be electrically connected to the data line DL7. The pixel circuits GC18 and GC28 may be electrically connected to the data line DL8. The dummy pixel circuit DC1 may be electrically connected to the data line DL9.

A portion of each of the pixel circuits BC15 and GC16 in the first row ROW1 may overlap the anode AE15. The pixel circuits BC15 and GC16 are electrically connected to the connection nodes CT15 and CT16, respectively. The pixel circuit BC15 may be connected to the anode AE15 of the second light emitting element BED through the connection node CT15. The pixel circuit GC16 may be connected to the anode AE16 of the third light emitting element GED through the connection node CT16.

A portion of each of the pixel circuits RC17 and GC18 in the first row ROW1 may overlap the anode AE17. The pixel circuits RC17 and GC18 are electrically connected to the connection nodes CT17 and CT18, respectively. The pixel circuit RC17 may be connected to the anode AE17 of the first light emitting element RED through the connection node CT17. The pixel circuit GC18 may be connected to the anode AE18 of the third light emitting element GED through the connection node CT18.

A portion of each of the pixel circuits BC25 and GC26 in the second row ROW2 may overlap the anode AE25. The pixel circuits BC25 and GC26 are electrically connected to the connection nodes CT25 and CT26, respectively. The pixel circuit BC25 may be connected to the second light emitting element BED in the pixel part PX23 through the connection node CT25 and the connection line CL12. The pixel circuit GC26 may be connected to the anode AE26 of the third light emitting element GED through the connection node CT26.

A portion of each of the pixel circuits RC27 and GC28 in the second row ROW2 may overlap the anode AE27. The pixel circuits RC27 and GC28 are electrically connected to the connection nodes CT27 and CT28, respectively. The pixel circuit RC27 may be connected to the anode AE25 of the first light emitting element RED in the pixel part PX25 through the connection node CT27 and the connection line CL13. The pixel circuit GC28 may be connected to the anode AE28 of the third light emitting element GED through the connection node CT28.

The arrangement method of the pixel circuits BC15, GC16, RC17, and GC18 and the pixel circuits BC25, GC26, RC27, and GC28 illustrated in FIG. 10B is merely an example, and thus, an embodiment of the present disclosure is not limited thereto. In addition, a size and shape of each of the pixel circuits BC15, GC16, RC17, and GC18 and the pixel circuits BC25, GC26, RC27 and GC28 may be variously changed.

Figure 11:
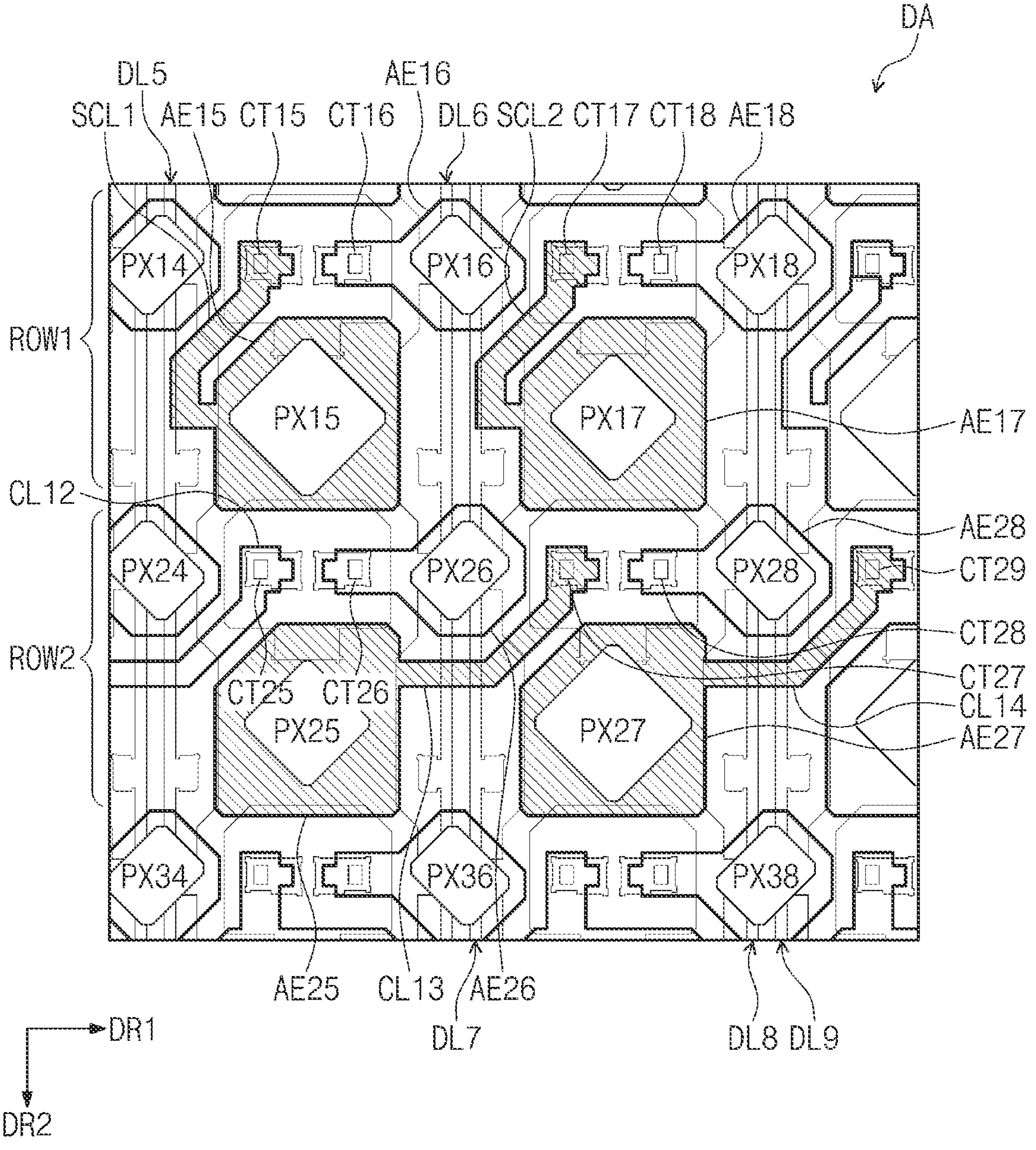
FIG. 11 is a plan view illustrating a display area of the display panel according to an embodiment of the present disclosure.

FIG. 11 is a plan view illustrating the display area DA of the display panel according to an embodiment of the present disclosure.

FIG. 11 illustrates only a portion of the pixel parts PX11 to PX48 illustrated in FIG. 4A. Among the components of the display panel DP illustrated in FIG. 11, the same reference numerals are used to refer to the same components as those of the display panel DP illustrated in FIG. 10A, and duplicated descriptions thereof are omitted.

Referring to FIG. 11, the anode AE15 of the light emitting element of the pixel part PX15 arranged in the first row ROW1 is electrically connected to the connection node CT15 through an auxiliary connection line SCL1. Also, the anode AE17 of the light emitting element of the pixel part PX17 arranged in the first row ROW1 is electrically connected to the connection node CT17 through an auxiliary connection line SCL2.

The connection line CL13 of the pixel part PX25 arranged in the second row ROW2 is disposed to be adjacent to the anode AE26 of the light emitting element of the pixel part PX26 and is disposed to be adjacent to the anode AE27 of the light emitting element of the pixel part PX27 in the plan view.

In the example illustrated in FIG. 10A, in order to arrange the connection line CL12, an area of the anode AE25 of the light emitting element of the pixel part PX25 arranged in the second row ROW2 is less than that of the anode AE17 of the light emitting element of the pixel part PX17 arranged in the first row ROW1. Also, the connection line CL13 of the pixel part PX25 and the anode AE26 of the light emitting element of the pixel part PX26 may be disposed adjacent to each other, and the connection line CL13 of the pixel part PX25 and the anode AE27 of the light emitting element of the pixel part PX27 may be disposed adjacent to each other. Thus, a capacitance of the anode AE25 of the light emitting element of the pixel part PX25 may be affected by the anode AE26 of the light emitting element of the pixel part PX26 and the anode AE27 of the light emitting element of the pixel part PX27. As a result, capacitance characteristics of the anode AE17 of the light emitting element of the pixel part PX17 arranged in the first row ROW1 and the anode AE25 of the light emitting element of the pixel part PX25 arranged in the second row ROW2 may be different from each other. In this case, even though the same data signal is provided to the pixel circuit RC17 (see FIG. 4A) of the pixel part PX17 arranged in the first row ROW1 and the pixel circuit BC25 (see FIG. 4A) of the pixel part PX25 arranged in the second row ROW2, a difference in luminance may occur.

As illustrated in FIG. 11, since the anode AE15 is connected to the connection node CT15 through the auxiliary connection line SCL1, capacitance characteristics of the anode AE15 of the light emitting element of the pixel part PX15 disposed in the first row ROW1 and the anode AE27 of the light emitting element of the pixel part PX27 disposed in the second row ROW2 may be similar to each other. In addition, since the anode AE17 is connected to the connection node CT17 through the auxiliary connection line SCL2, capacitance characteristics of the anode AE17 of the light emitting element of the pixel part PX17 arranged in the first row ROW1 and the anode AE25 of the light emitting element of the pixel part PX25 arranged in the second row ROW2 may be similar to each other. As a result, display quality may be prevented from being deteriorated due to the difference in luminance between the pixel parts PX15 and PX17 arranged in the first row ROW1 and the pixel parts PX25 and PX27 arranged in the second row ROW2. A shape and size of each of the auxiliary connection lines SCL1 and SCL2 are not limited to the example illustrated in FIG. 11 and may be changed variously. Also, the pixel circuits BC15, GC16, RC17, and GC18 and the pixel circuits BC25, GC26, RC27 and GC28 illustrated in FIG. 10B may be disposed in the display area DA of FIG. 11 in a similar manner.

Figure 12:
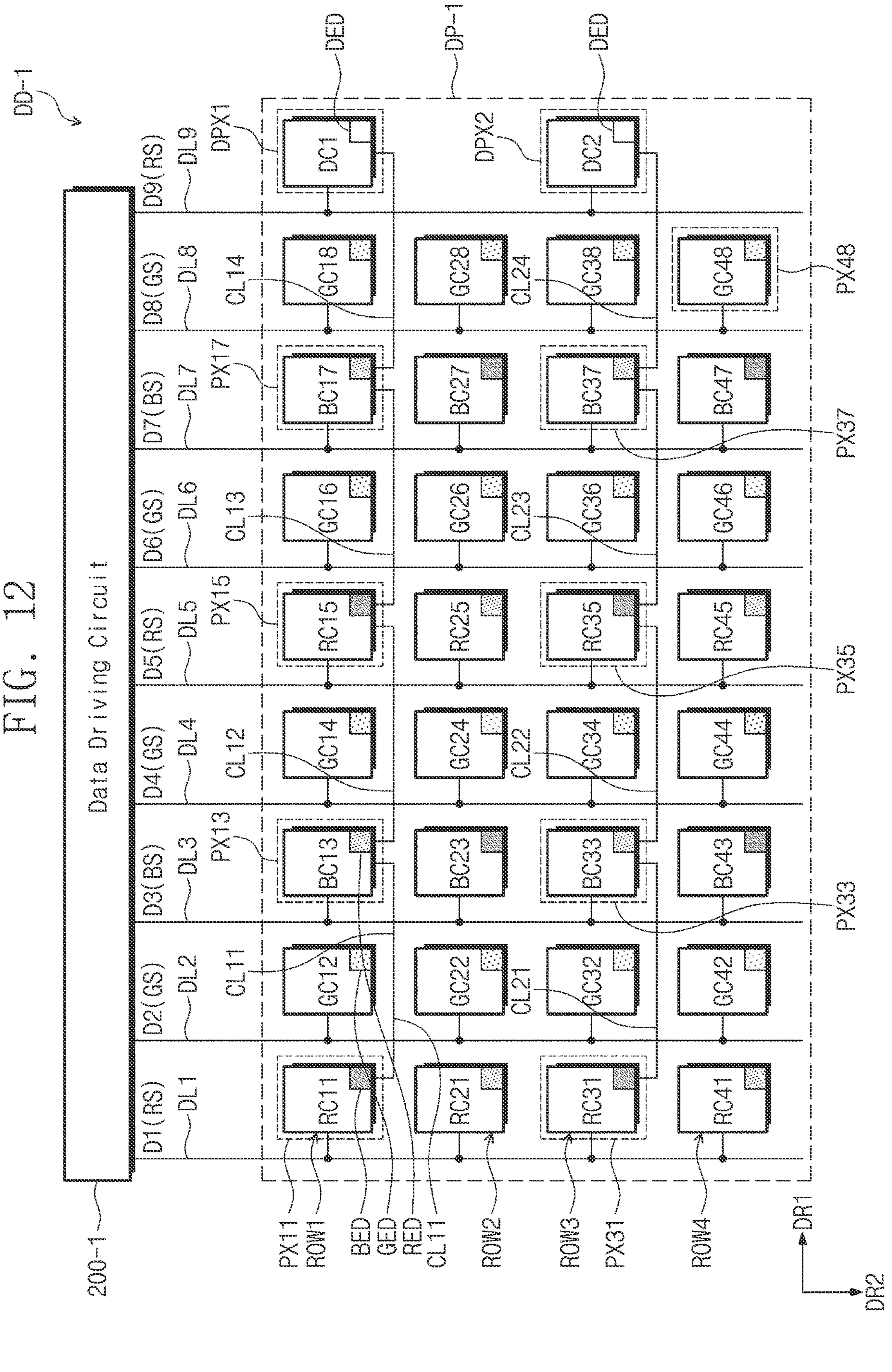
FIG. 12 is a view illustrating an example of the display device according to an embodiment of the present disclosure.

FIG. 12 is a view illustrating an example of the display device DD-1 according to an embodiment of the present disclosure.

Referring to FIG. 12, a display device DD-1 includes a data driving circuit 200-1 and a display panel DP-1. The display panel DP-1 includes pixel parts PX11 to PX48, dummy pixel parts DPX1 and DPX2, and data lines DL1 to DL9.

The display device DD-1 illustrated in FIG. 12 has a configuration similar to that of the display device DD illustrated in FIG. 4A. Among the components of the display device DD-1 illustrated in FIG. 12, duplicated descriptions with respect to components similar to those of the display device DD illustrated in FIG. 4A will be omitted.

A pixel circuit and a light emitting element are disposed in each of the pixel parts PX11 to PX48, and the pixel circuit may be connected to the corresponding data line among the data lines DL1 to DL8.

In an embodiment, a second light emitting element BED of each of the pixel parts PX11 and PX15 in a first row ROW1 and pixel parts PX31 and PX35 in a third row ROW3 is electrically connected to corresponding one of the pixel circuits BC13, BC17, BC33, and BC37 of the pixel parts PX13, PX17, PX33, and PX37 through connection lines CL11, CL13, CL21, and CL23.

The first light emitting element RED of the pixel part PX13 in the first row ROW1 is electrically connected to the pixel circuit RC15 of the pixel part PX15 through the connection line CL12. The first light emitting element RED of the pixel part PX33 in the third row ROW3 is electrically connected to the pixel circuit RC35 of the pixel part PX35 through the connection line CL22.

The first light emitting element RED of the pixel part PX17 in the first row ROW1 is electrically connected to a dummy pixel circuit DC1 of a dummy pixel part DPX1 through a connection line CL14. The first light emitting element RED of the pixel part PX37 in the third row ROW3 is electrically connected to a dummy pixel circuit DC2 of a dummy pixel part DPX2 through a connection line CL24.

In an embodiment, the dummy pixel parts DPX1 and DPX2 illustrated in FIG. 12 may be substantially the same as the pixel parts PX11, PX15, PX31, and PX35.

In an embodiment, each of data signals D1, D5, and D9 provided to data lines DL1, DL5, and DL9 may be a first color signal RS. Each of data signals D2, D4, D6, and D8 provided to data lines DL2, DL4, DL6, and DL8 may be a third color signal GS. Each of data signals D3 and D7 provided to data lines DL3 and DL7 may be a second color signal BS.

The data lines DL1 to DL9 illustrated in FIG. 12 may be arranged as illustrated in FIG. 4B. That is, in the data lines DL1 to DL9, the data lines DL2 and DL3 may be disposed adjacent to each other with no pixel part disposed therebetween, the data lines DL4 and DL5 may be disposed adjacent to each other with no pixel part disposed therebetween, the data lines DL6 and DL7 may be disposed adjacent to each other with no pixel part disposed therebetween, and the data lines DL8 and DL9 may be disposed adjacent to each other with no pixel part disposed therebetween.

In this embodiment, each of the pixel circuits RC11, RC21, RC31, RC41, BC13, BC23, BC33, BC43, RC15, RC25, RC35, RC45, BC17, BC27, BC37, and BC47 and the dummy pixel circuits DC1 and DC2 in odd-numbered pixel columns may be connected to a data line disposed on the left side of the pixel circuits among the data lines DL1 to DL9. In addition, each of the pixel circuits GC12 to GC48 in the even-numbered pixel columns may be connected to a data line disposed on the right side of the pixel circuits among the data lines DL1 to DL9.

Figure 13:
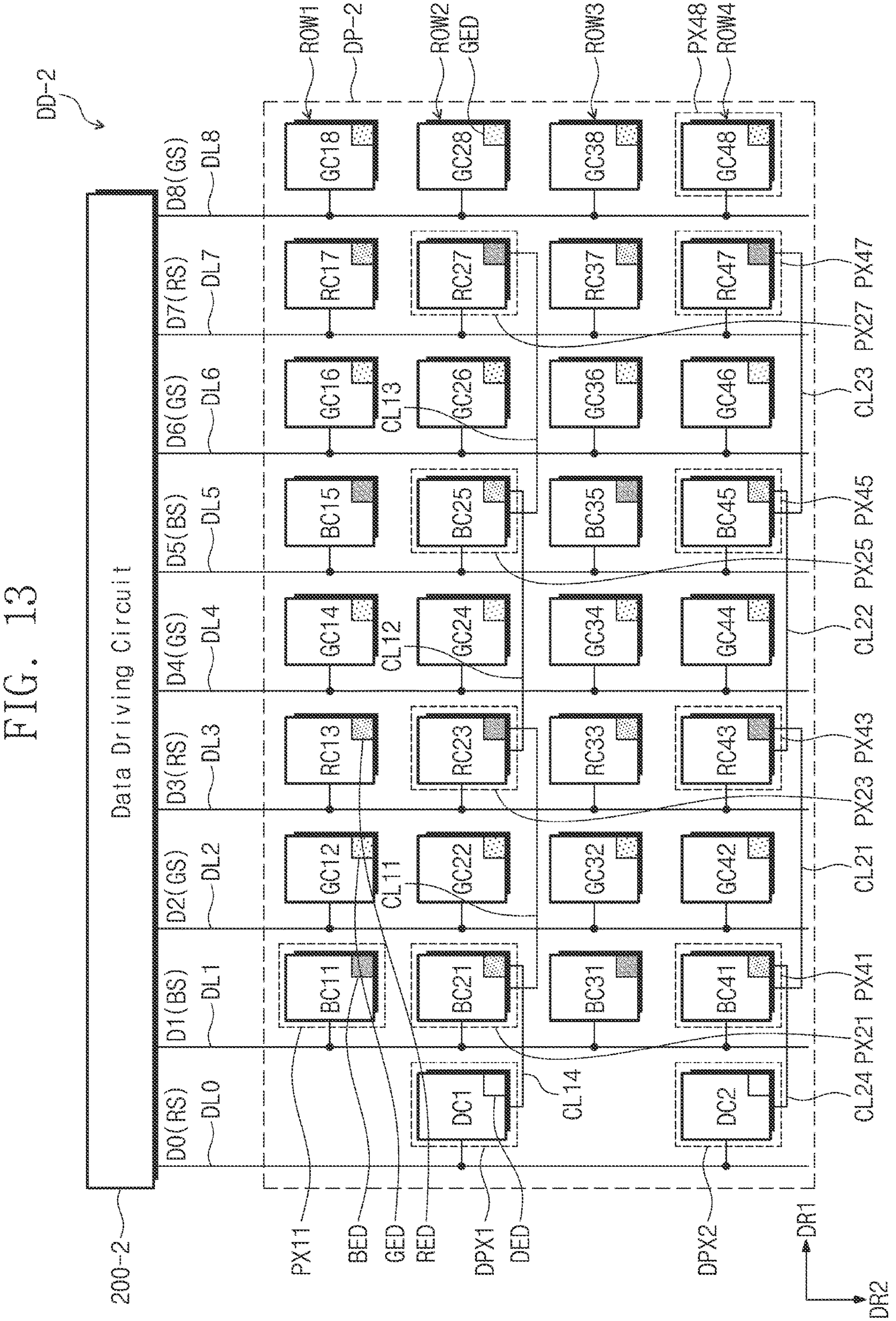
FIG. 13 is a view illustrating an example of the display device according to an embodiment of the present disclosure.

FIG. 13 is a view illustrating an example of the display device DD-2 according to an embodiment of the present disclosure.

Referring to FIG. 13, a display device DD-2 includes a data driving circuit 200-2 and a display panel DP-2. The display panel DP-2 includes pixel parts PX11 to PX48, dummy pixel parts DPX1 and DPX2, and data lines DL0 to DL8.

The display device DD-2 illustrated in FIG. 13 has a configuration similar to that of the display device DD illustrated in FIG. 4A. Among the components of the display device DD-2 illustrated in FIG. 13, duplicated descriptions with respect to components similar to those of the display device DD illustrated in FIG. 4A will be omitted.

Each of the pixel parts PX11 to PX48 may include a corresponding one of the pixel circuits RC13 to RC47, BC11 to BC45, and GC12 to GC48 and one light emitting element.

In an embodiment, a first light emitting element RED of a pixel part PX21 in a second row ROW2 is electrically connected to a dummy pixel circuit DC1 of a dummy pixel part DPX1 through a connection line CL14. A first light emitting element RED of a pixel part PX41 in a fourth row ROW4 is electrically connected to a dummy pixel circuit DC2 of a dummy pixel part DPX2 through a connection line CL24.

A first light emitting element RED of each of a pixel part PX25 in the second row ROW2 and a pixel part PX45 in the fourth row ROW4 is electrically connected to corresponding one of pixel circuits RC23 and RC43 of pixel parts PX23 and PX43 through connection lines CL12 and CL22.

A second light emitting element BED of each of pixel parts PX23 and PX27 in a second row ROW2 and pixel parts PX43 and PX47 in the fourth row ROW4 is electrically connected to corresponding one of pixel circuits BC21, BC25, BC41, and BC45 of pixel parts PX21, PX25, PX41, and PX45 through connection lines CL11, CL13, CL21, and CL23.

In an embodiment, the dummy pixel circuits DC1 and DC2 of the dummy pixel parts DPX1 and DPX2 illustrated in FIG. 13 may be substantially the same as the pixel circuits BC11, BC15, BC31, and BC35.

In an embodiment, each of data signals D0, D3, and D7 provided to data lines DL0, DL3, and DL7 may be first color signal RS. Each of data signals D1 and D5 provided to data lines DL1 and DL5 may be a second color signal BS. Each of data signals D2, D4, D6, and D8 provided to data lines DL2, DL4, DL6, and DL8 may be a third color signal GS.

The data lines DL0 to DL8 illustrated in FIG. 13 may be arranged as illustrated in FIG. 4B. That is, in the data lines DL0 to DL8, the data lines DL0 and DL1 may be disposed adjacent to each other with no pixel part disposed therebetween, the data lines DL2 and DL3 may be disposed adjacent to each other with no pixel part disposed therebetween, and the data lines DL4 and DL5 may be disposed adjacent to each other with no pixel part disposed therebetween, and the data lines DL6 and DL7 may be disposed adjacent to each other with no pixel part disposed therebetween.

In this embodiment, each of the pixel circuits BC11, BC21, BC31, BC41, RC13, RC23, RC33, RC43, BC15, BC25, BC35, BC45, RC17, RC27, RC37, and RC47 in odd-numbered pixel columns may be connected to a data line disposed on the left side of the pixel circuits among the data lines DL0 to DL8. Also, the pixel circuits GC12 to GC48 and the dummy pixel circuits DC1 and DC2 in even-numbered pixel columns may be connected to a data line disposed on the right side of the pixel circuits among the data lines DL0 to DL8.

Figure 14:
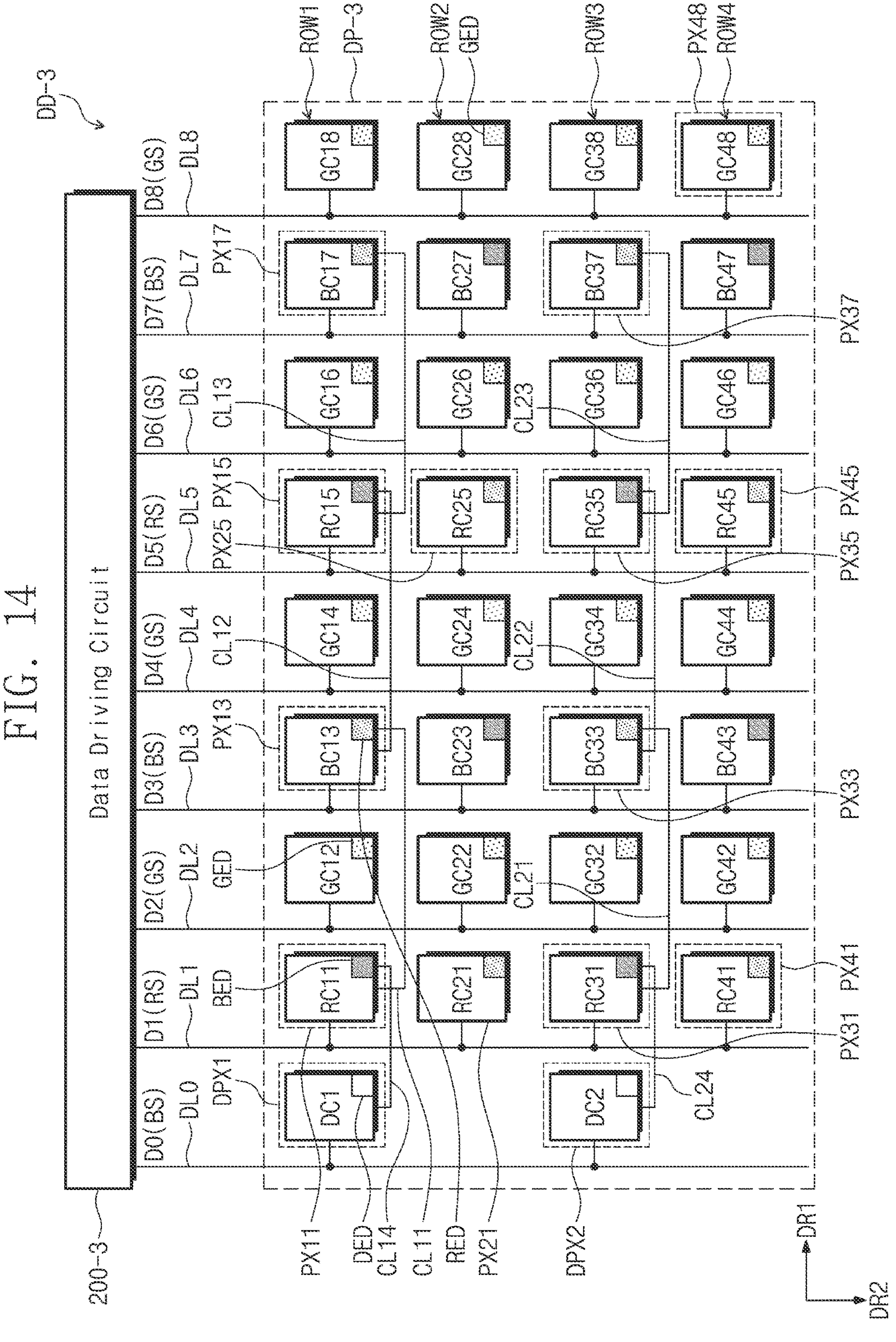
FIG. 14 is a view illustrating an example of the display device according to an embodiment of the present disclosure.

FIG. 14 is a view illustrating an example of the display device DD-3 according to an embodiment of the present disclosure.

Referring to FIG. 14, a display device DD-3 includes a data driving circuit 200-3 and a display panel DP-3. The display panel DP-3 includes pixel parts PX11 to PX48, dummy pixel parts DPX1 and DPX2, and data lines DL0 to DL8.

The display device DD-3 illustrated in FIG. 14 has a configuration similar to that of the display device DD illustrated in FIG. 4A. Among the components of the display device DD-3 illustrated in FIG. 14, duplicated descriptions with respect to components similar to those of the display device DD illustrated in FIG. 4A will be omitted.

Each of the pixel parts PX11 to PX48 may include a corresponding one of the pixel circuits RC11 to RC45, BC13 to BC47, and GC12 to GC48 and one light emitting element.

In an embodiment, a second light emitting element BED of the pixel part PX11 in the first row ROW1 is electrically connected to a dummy pixel circuit DC1 of a dummy pixel part DPX1 through a connection line CL14. A second light emitting element BED of the pixel part PX31 in a third row ROW3 is electrically connected to a dummy pixel circuit DC2 of a dummy pixel part DPX2 through a connection line CL24.

A first light emitting element RED of each of the pixel parts PX13 and PX17 in the first row ROW1 and the pixel parts PX33 and PX37 in the third row ROW3 is connected to corresponding one of the pixel circuits RC11, RC15, RC31, and RC35 of the pixel parts PX11, PX15, PX31, and PX35 through connection lines CL11, CL13, CL21, and CL23.

A second light emitting element BED of each of the pixel part PX15 in the first row ROW1 and the pixel part PX35 in the third row ROW3 is connected to corresponding one of the pixel circuits BC13 and BC33 of the pixel parts PX13 and PX33 through connection lines CL12 and CL22.

In an embodiment, each of the dummy pixel parts DPX1 and DPX2 illustrated in FIG. 14 may be substantially the same as each of the pixel parts PX21, PX25, PX41, and PX45.

In an embodiment, each of data signals D0, D3, and D7 provided to data lines DL0, DL3, and DL7 may be a second color signal BS. Each of data signals D1 and D5 provided to data lines DL1 and DL5 may be a first color signal RS. Each of data signals D2, D4, D6, and D8 provided to data lines DL2, DL4, DL6, and DL8 may be a third color signal GS.

The data lines DL0 to DL8 illustrated in FIG. 14 may be arranged as illustrated in FIG. 4B. That is, in the data lines DL0 to DL8, the data lines DL0 and DL1 may be disposed adjacent to each other with no pixel part disposed therebetween, the data lines DL2 and DL3 may be disposed adjacent to each other with no pixel part disposed therebetween, and the data lines DL4 and DL5 may be disposed adjacent to each other with no pixel part disposed therebetween, and the data lines DL6 and DL7 may be disposed adjacent to each other with no pixel part disposed therebetween.

In this embodiment, each of the pixel circuits RC11, RC21, RC31, RC41, BC13, BC23, BC33, BC43, RC15, RC25, RC35, RC45, BC17, BC27, BC37, and BC47 in odd-numbered pixel columns may be connected to a data line disposed on the left side of the pixel circuits among the data lines DL0 to DL8. Also, the pixel circuits GC12 to GC48 and the dummy pixel circuits DC1 and DC2 in even-numbered pixel columns may be connected to a data line disposed on the right side of the pixel circuits among the data lines DL0 to DL8.

Figure 15:
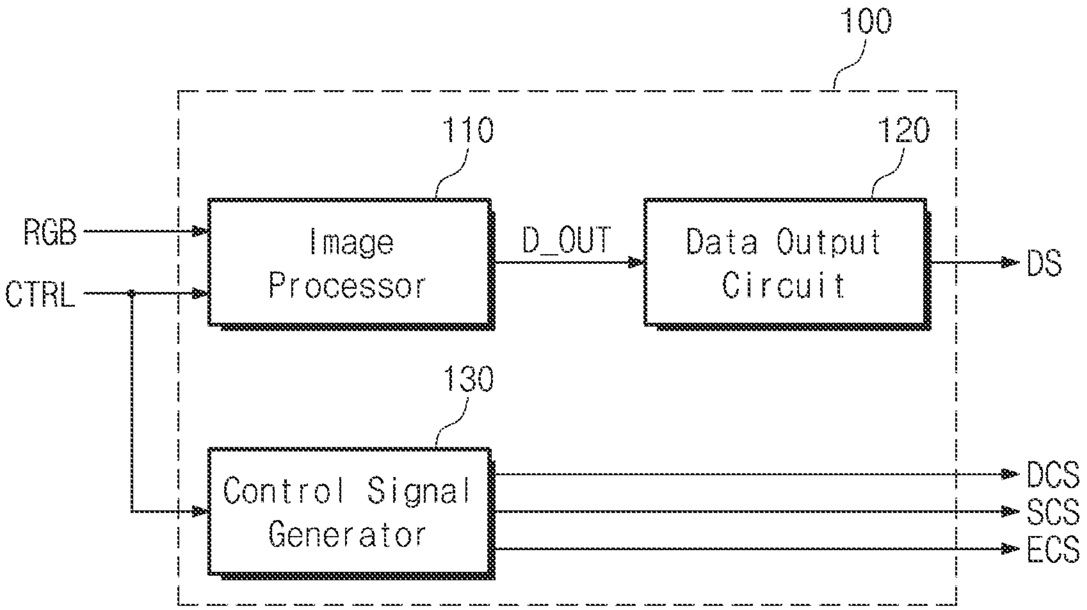
FIG. 15 is a block diagram illustrating a driving controller according to an embodiment of the present disclosure.

FIG. 15 is a block diagram illustrating a driving controller 100 according to an embodiment of the present disclosure.

Referring to FIG. 15, a driving controller 100 includes an image processor 110, a data output circuit 120, and a control signal generator 130.

The image processor 110 outputs a data signal D_OUT in response to an input image signal RGB and a control signal CTRL. In an embodiment, the image processor 110 may include various functions and circuits for improving display quality of an image to be displayed on the display panel DP (see FIG. 4A).

The data output circuit 120 may output an output image signal DS in which an output order of the data signal D_OUT is changed. In an embodiment, the data output circuit 120 may output the output image signal DS in which an output order of the data signal D_OUT is changed in response to the control signal CTRL.

In an embodiment, the data signal D_OUT output from the image processor 110 may be suitable for an arrangement order of the pixel parts PX11 to PX48 of the display panel DP (see FIG. 4A).

If the output order of the data signal D_OUT output from the image processor 110 is not changed, but outputs the data signal D_OUT as it is, the data signals D1, D2, and D3 illustrated in FIGS. 3A and 3B may be provided to the data lines DL1, DL2, and DL3.

The data output circuit 120 outputs the output image signal DS by changing the output order of the data signal D_OUT. As a result, a data driving circuit 200 may provide the data signals D1, D2, and D3 to the data lines DL1, DL2 and DL3 as illustrated in FIGS. 5A and 5B.

That is, a second color signal BS is provided to the data line DL1 as the data signal D1. A third color signal GS is provided to the data line DL2 as the data signal D2. A first color signal RS is provided to the data line DL3 as the data signal D3.

A control signal generator 130 outputs a data control signal DCS, a scan control signal SCS, and an emission driving signal ECS in response to a control signal CTRL.

In the display device having the above-described configuration, the data driving circuit may output only the data signal having the first color to the first data output line and outputs the data signal having the second color to the second data output line to reduce the power consumption of the display device.

It will be apparent to those skilled in the art that various modifications and deviations can be made in the present inventive concept. Thus, it is intended that the present inventive concept covers the modifications and deviations of this inventive concept provided they come within the scope of the appended claims and their equivalents. Therefore, the technical scope of the present disclosure is not limited to the contents described in the detailed description of the specification, but should be determined by the claims.

What is claimed is:

1. A display panel comprising:

a first scan line and a second scan line respectively extending in a first direction;

a first data line, a second data line, and a third data line respectively extending in a second direction crossing the first direction;

a plurality of first row pixel parts disposed in a first row and connected to the first scan line; and a plurality of second row pixel parts disposed in a second row, and connected to the second scan line, the plurality of second row pixel parts comprising:

a first pixel part including a first pixel circuit connected to the first data line and a first light emitting element which are electrically separated from each other, a second pixel part including a second pixel circuit connected to the second data line and a second light emitting element which are electrically connected to each other, and a third pixel part including a third pixel circuit connected to the third data line and a third light emitting element which are electrically separated from each other, wherein the first light emitting element of the first pixel part is electrically connected to the third pixel circuit of the third pixel part, and wherein the second data line and the third data line are disposed adjacent to each other between the second pixel circuit and the third pixel circuit.

2. The display panel of claim 1, wherein each of the plurality of first row pixel parts comprises a pixel circuit and a light emitting element that is electrically connected to the pixel circuit.

3. The display panel of claim 1, further comprising:

wherein the first data line receives a first color signal and the second data line receives a second color signal different from the first color signal.

4. The display panel of claim 1, wherein the first light emitting element, the second light emitting element, and the third light emitting element emit light having colors different from one another.

5. The display panel of claim 1, wherein the second data line and the third data line are disposed adjacent to each other with no pixel circuit disposed therebetween.

6. The display panel of claim 1, wherein the first light emitting element comprises a connection line extending from the first light emitting element and electrically connected to the third pixel circuit, and wherein the connection line overlaps second data line and the third data line in a plan view.

7. The display panel of claim 1, wherein the first pixel circuit overlaps the first light emitting element in a plan view, and the third pixel circuit overlaps the third light emitting element in a plan view.

8. The display panel of claim 1, wherein the first data line transmits a first color signal corresponding to a first color, the second data line transmits a second color signal corresponding to a second color, and the third data line transmits a third color signal corresponding to a third color.

9. The display panel of claim 8, wherein the first light emitting element emits a third color light corresponding to the third color, the second light emitting element emits a second color light corresponding to the second color, and the third light emitting element emits a first color light corresponding to the first color.

10. The display panel of claim 1, wherein the first light emitting element, the second light emitting element and the third color light element sequentially disposed according to the first direction.

11. A display device comprising:

a display panel comprising a first data line, a second data line, a third data line, first pixel parts disposed in a first row, second pixel parts disposed in a second row;

a driving circuit which receives an input image signal and output an output image signal corresponding to the input image signal; and a data driving circuit which provides a data signal to each of the first data line, the second data line, and the third data line in response to the output image signal, wherein a second pixel part corresponding to the first data line among the second pixel parts comprises a first pixel circuit and a first light emitting element which are electrically separated from each other, wherein a second pixel part corresponding to the second data line among the second pixel parts comprises a second pixel circuit and a second light emitting element which are electrically separated from each other, wherein a second pixel part corresponding to the third data line among the second pixel parts comprises a dummy pixel circuit, wherein the first light emitting element is electrically connected to the second pixel circuit, wherein the second light emitting element is electrically connected to the dummy pixel circuit, wherein the first pixel circuit of the second pixel part is connected to the first data line, the second pixel circuit of the second pixel part is connected to the second data line, and the dummy pixel circuit of the second pixel part is connected to the third data line, and wherein the data driving circuit provides a first color signal to the second data line and provides a second color signal different from the first color signal to the first data line and the third data line.

12. The display device of claim 11, wherein the first data line and the second data line are disposed to be space apart from each other with at least one data line disposed therebetween.

13. The display device of claim 11, wherein the driving circuit comprises:

an image processor which outputs a data signal corresponding to the input image signal; and a data output circuit which outputs the output image signal in which an output order of the data signal is changed so that the second color signal is output to the first data line and the third data line, and the first color signal is output to the second data line in response to a control signal.

14. The display device of claim 11, wherein a first pixel part connected to the first data line among the first pixel parts comprises a pixel circuit and a light emitting element which are electrically connected to each other, and wherein a first pixel part connected to the second data line among the first pixel parts comprises a pixel circuit and a light emitting element which are electrically connected to each other.

15. A display device comprising:

a first row first pixel part arranged in a first row and comprising a first pixel circuit and a first light emitting element which are electrically connected to each other;

a first row second pixel part arranged in the first row and comprising a second pixel circuit and a second light emitting element which are electrically connected to each other;

a second row first pixel part arranged in a second row and comprising a third pixel circuit and a third light emitting element which are electrically separated from each other;

a second row second pixel part arranged in the second row and comprising a fourth pixel circuit and a fourth light emitting element which are electrically connected to each other;

a second row third pixel part arranged in the second row and comprising a fifth pixel circuit and a fifth light emitting element which are electrically separated from each other;

an auxiliary connection line which electrically connects the first pixel circuit and the first light emitting element of the first row first pixel part to each other;

a connection line which electrically connects the third light emitting element of the second row first pixel part to the fifth pixel circuit of the second row second pixel part;

a first data line electrically connected to the first pixel circuit and the third pixel circuit;

a second data line electrically connected to the second pixel circuit and the fourth pixel circuit;

a third data line electrically connected to the fifth pixel circuit; and a data driving circuit which provides a first color signal to the third data line and provide a second color signal different from the first color signal to the second data line, and a third color signal different from the first color signal and the second color signal to the first data line, wherein the second data line and the third data line are disposed adjacent to each other between the second pixel circuit and the third pixel circuit.

16. The display device of claim 15, further comprising a driving circuit which receives an input image signal and output an output image signal corresponding to the input image signal, wherein the data driving circuit provides the first color signal to the second data line and provides the second color signal to the first data line in response to the output image signal.

17. The display device of claim 16, wherein the driving circuit comprises:

an image processor which outputs a data signal corresponding to the input image signal; and a data output circuit which outputs the output image signal in which an output order of the data signal is changed so that the second color signal is output to the first data line, and the first color signal is output to the second data line.

18. The display device of claim 15, wherein the first light emitting element comprises an anode and a cathode, and wherein the auxiliary connection line extends from the anode and electrically connected to the first pixel circuit.

19. The display device of claim 15, wherein the third light emitting element comprises an anode and a cathode, and wherein the connection line extends from the anode and electrically connected to the fourth pixel circuit.

20. A display device comprising:

a first data line which transmits a first data signal corresponding to a first color;

a second data line which transmits a second data signal corresponding to a second color;

a third data line which transmits a third data signal corresponding to the third color;

a first pixel part in which a first pixel circuit connected to the first data line and a first light emitting element that is electrically separated from the first pixel circuit are disposed;

a second pixel part in which a second pixel circuit connected to the second data line and a second light emitting element that is electrically connected to the second pixel circuit are disposed;

a third pixel part in which a third pixel circuit connected to the third data line and a third light emitting element that is electrically separated from the third pixel circuit are disposed;

a dummy pixel part comprising a dummy pixel circuit connected to the dummy data line; and a connection line which electrically connects the first light emitting element of the first pixel part to the third pixel circuit of the third pixel part, wherein the second data line and the third data line are disposed adjacent to each other between the second pixel circuit and the third pixel circuit.

21. The display device of claim 20, wherein the first light emitting element emits light corresponding to the third color, the second light emitting element emits light corresponding to the second color, and the third light emitting element emits light corresponding to the first color.

22. The display device of claim 20, further comprising:

a fourth data line which transmits a third data signal corresponding to the third color;

a dummy pixel part comprising a dummy pixel circuit connected to the fourth data line; and a dummy connection line which electrically connects the third light emitting element of the third pixel part to the dummy pixel circuit.

23. The display device of claim 20, further comprising:

a fourth pixel part in which a fourth pixel circuit connected to the first data line and a fourth light emitting element electrically connected to the fourth pixel circuit are disposed; and a fifth pixel part in which a fifth pixel circuit connected to the second data line and a fifth light emitting element electrically connected to the fifth pixel circuit are disposed.

24. The display device of claim 23, wherein the fourth light emitting element emits light corresponding to the first color and the fifth light emitting element emits light corresponding to the second color.

* * * * *